(12) United States Patent
Maguire

(10) Patent No.: US 7,234,247 B2
(45) Date of Patent: Jun. 26, 2007

(54) LOW PRESSURE DRYER

(76) Inventor: Stephen B. Maguire, 11 Crozerville Rd., Aston, PA (US) 19014

( * ) Notice: Subject to any disclaimer, the term of this patent is extended or adjusted under 35 U.S.C. 154(b) by 507 days.

(21) Appl. No.: 09/883,837

(22) Filed: Jun. 18, 2001

(65) Prior Publication Data

US 2002/0024162 A1 Feb. 28, 2002

Related U.S. Application Data

(60) Provisional application No. 60/212,112, filed on Jun. 16, 2000.

(51) Int. Cl.
*F26B 19/00* (2006.01)
*F26B 25/06* (2006.01)

(52) U.S. Cl. .............. 34/92; 34/87; 34/89; 34/202
(58) Field of Classification Search .............. 222/1, 222/504, 509; 34/402, 403, 406, 408, 524, 34/550, 87, 89, 92, 201–203
See application file for complete search history.

(56) References Cited

U.S. PATENT DOCUMENTS

| | | | |
|---|---|---|---|
| 512,673 A | 1/1894 | Mason | 432/102 |
| 753,597 A | 3/1904 | Long | |
| 960,857 A | 6/1910 | Eggert | 414/221 |
| 1,520,017 A | 12/1924 | Denton | |
| 1,620,289 A | 3/1927 | Ridley | |
| 1,625,451 A | 4/1927 | Brown | 29/428 |
| 2,161,190 A | 6/1939 | Paull | 221/104 |
| 2,550,240 A | 4/1951 | Geiger et al. | 222/361 |
| 2,569,085 A * | 9/1951 | David et al. | 222/200 |
| 2,587,338 A | 2/1952 | Lee et al. | 222/361 |
| 3,111,115 A | 11/1963 | Best | 119/52 |
| 3,113,032 A | 12/1963 | Wayne | 99/199 |
| 3,115,276 A | 12/1963 | Johanningmeier | 222/49 |
| 3,138,117 A | 6/1964 | Dorey | 105/282 |
| 3,209,898 A | 10/1965 | Beebe et al. | 198/205 |
| 3,348,848 A | 10/1967 | Lucking et al. | 277/26 |
| 3,470,994 A | 10/1969 | Schnell et al. | 198/1 |
| 3,597,850 A | 8/1971 | Jenkins | 34/10 |
| 3,698,098 A | 10/1972 | Ramsay | 34/15 |
| 3,834,038 A | 9/1974 | Janda | 34/1 |
| 3,959,636 A | 5/1976 | Johnson et al. | 235/151.33 |
| 3,969,314 A | 7/1976 | Grigull | 260/42 |
| 3,985,262 A | 10/1976 | Nauta | 220/349 |
| 4,026,442 A | 5/1977 | Orton | 222/181 |

(Continued)

FOREIGN PATENT DOCUMENTS

AU 417596 6/1971

(Continued)

OTHER PUBLICATIONS

Two–sided flyer entitled "GB 140 Series Compact Auto Weigh Blender" published by Conair Franklin in the United States, Jun. 1994.

(Continued)

*Primary Examiner*—Kenneth Rinehart
(74) *Attorney, Agent, or Firm*—Charles N. Quinn

(57) ABSTRACT

A low pressure dryer for granular or powdery material includes a plurality of canisters rotatable about a common vertical axis serially among material heating, vacuum drying and material inventory discharge positions; pneumatic piston-cylinder means for rotating the canisters about said axis among said heating, vacuum drying and inventory discharge positions; means for heating contents of a canister at said heating position; means for sealing and drawing vacuum within a canister at said vacuum drying position and means for selectably permitting downward flow of dried granular or powdery material out of a canister at said discharge position where said canisters move collectively and unitarily one with another.

20 Claims, 20 Drawing Sheets

U.S. PATENT DOCUMENTS

| | | | | |
|---|---|---|---|---|
| 4,108,334 | A | 8/1978 | Moller | 222/136 |
| 4,127,947 | A | 12/1978 | Webb et al. | 34/92 |
| 4,148,100 | A | 4/1979 | Moller | 366/150 |
| 4,219,136 | A | 8/1980 | Williams et al. | 222/450 |
| 4,294,020 | A | 10/1981 | Evans | 34/168 |
| 4,354,622 | A | 10/1982 | Wood | 222/55 |
| 4,364,666 | A | 12/1982 | Keyes | 366/142 |
| 4,394,941 | A | 7/1983 | Recine | 222/355 |
| 4,402,436 | A | 9/1983 | Hellgren | 222/561 |
| 4,454,943 | A | 6/1984 | Moller | 198/657 |
| 4,475,672 | A | 10/1984 | Whitehead | 222/561 |
| 4,498,783 | A | 2/1985 | Rudolph | 366/132 |
| 4,505,407 | A | 3/1985 | Johnson | 222/181 |
| 4,510,106 | A | 4/1985 | Hirsch | 264/53 |
| 4,525,071 | A | 6/1985 | Horowitz et al. | 366/152 |
| 4,531,308 | A | 7/1985 | Neilson et al. | 34/168 |
| 4,581,704 | A | 4/1986 | Mitsukawa | 364/479 |
| 4,619,379 | A | 10/1986 | Biehl | 222/153 |
| 4,705,083 | A | 11/1987 | Rossetti | 141/104 |
| 4,756,348 | A | 7/1988 | Moller | 141/83 |
| 4,793,711 | A | 12/1988 | Ohlson | 366/18 |
| 4,830,508 | A | 5/1989 | Higuchi et al. | 366/152 |
| 4,848,534 | A | 7/1989 | Sandwall | 198/535 |
| 4,850,703 | A | 7/1989 | Hanaoka et al. | 366/160 |
| 5,064,328 | A * | 11/1991 | Raker | 412/12 |
| 5,110,521 | A | 5/1992 | Moller | 264/40.4 |
| 5,116,547 | A | 5/1992 | Tsukahara et al. | 264/1.1 |
| 5,132,897 | A | 7/1992 | Allenberg | 364/149 |
| 5,148,943 | A | 9/1992 | Moller | 222/1 |
| 5,172,489 | A | 12/1992 | Moller | 34/32 |
| 5,225,210 | A | 7/1993 | Shimoda | 425/145 |
| 5,261,743 | A | 11/1993 | Moller | 366/196 |
| 5,285,930 | A | 2/1994 | Nielsen | 222/1 |
| 5,293,697 | A | 3/1994 | Kawakami | 34/92 |
| 5,340,949 | A | 8/1994 | Fujimura et al. | 177/25.18 |
| 5,423,455 | A | 6/1995 | Ricciardi et al. | 222/1 |
| 5,433,020 | A | 7/1995 | Leech | 34/403 |
| 5,501,143 | A | 3/1996 | Thom, Jr. | 99/516 |
| 5,513,445 | A | 5/1996 | Farrag | 34/362 |
| 5,594,035 | A | 1/1997 | Walsh | 521/47 |
| 5,651,401 | A | 7/1997 | Cados | 141/129 |
| 5,732,478 | A | 3/1998 | Chapman | 34/629 |
| 5,767,453 | A | 6/1998 | Wakou et al. | 177/25.18 |
| 5,780,779 | A | 7/1998 | Kitamura et al. | 177/105 |
| 5,807,422 | A | 9/1998 | Grgich et al. | 95/10 |
| 5,843,513 | A | 12/1998 | Wilke et al. | 426/646 |
| 6,079,122 | A | 6/2000 | Rajkovich | 34/574 |
| 6,151,795 | A | 11/2000 | Hoffman et al. | 34/92 |
| 6,315,902 | B1 | 11/2001 | Collasius et al. | 210/232 |
| 6,449,875 | B1 | 9/2002 | Becker et al. | 34/491 |

FOREIGN PATENT DOCUMENTS

| | | |
|---|---|---|
| CA | 1100402 | 5/1981 |
| DE | 421770 | 11/1925 |
| DE | 623 000 | 6/1937 |
| DE | 3541532 | 5/1986 |
| DE | 3923241 | 1/1991 |
| DE | 4300060 | 7/1994 |
| DE | 43 00 060 | 7/1994 |
| DE | 4300595 | 7/1994 |
| DE | 4323295 | 2/1995 |
| EP | 0318170 | 5/1989 |
| EP | 0466362 | 1/1992 |
| EP | 0507689 | 10/1992 |
| EP | 0587085 | 3/1994 |
| EP | 1288600 | 3/2003 |
| FR | 2235775 | 1/1975 |
| FR | 2109840 | 5/1979 |
| GB | 849613 | 9/1960 |
| GB | 2081687 | 2/1982 |
| JP | 59082936 | 5/1984 |
| JP | 01235604 | 9/1989 |
| JP | 01286806 | 11/1989 |
| JP | 4201522 | 7/1992 |
| JP | 06114834 | 4/1994 |

OTHER PUBLICATIONS

Six page brochure entitled "Graviblend Precise Continuous Weigh Blenders" published by Ktron, Vertech, Jun. 1991, United States.

One page flyer entitled "Gravimix, The New Gravimetric Blending Generation" published by Ferlin, De demsvaard, Holland, circa 1993.

16 page Low Pressure Dryer Technical Information Specifications Features of Maguire Products, Inc. dated Nov. 29, 2000.

One page article entitled "New Dryer Technologies at NPE Aren't Just Hot Air", Plastics Technology, Aug. 2000, p. 19.

One page article entitled "Tech Preview", Automatic Plastics, Aug. 2000, p. 66.

One page article entitled "Maguire expands Low Pressure Dryer commercialization" from www.specialchem.com dated Mar. 30, 2001.

One page article entitled "Smaller Resin Dryer", Plastics Engineering, Aug. 2001, p. 28.

Five page brochure entitled LPD™ Series Dryers of Maguire Products, Inc. dated Jan. 29, 2001.

Two page press released entitled "Maguire® LPD™ 30, Smaller Model Of Breakthrough Resin Dryer, Will Make World Debut at K 2001 Show" of Maguire Products, Inc. dated Jun. 29, 2001.

Three page press release entitled "In Commercial Use By Wide Range Of Plastic Processors, Maguire® LPD™ Resin Dryer Yields Big Savings In Energy Costs" of Maguire Products, Inc. dated May 14, 2001.

Two page press release entitled "Maguire Obtains Patent On Fundamentally New Resin Dryer And Steps Up Program For Worldwide Commercialization" of Maguire Products, Inc. dated Dec. 18, 2000.

Six page press release entitled "Fast, Low–Cost Process Transforms Resin Drying, Promising Dramatic Advance in Industry Productivity And Quality" of Maguire Products, Inc. dated Jun. 20, 2000.

Two page press release entitled "New–Concept Resin Dryer Enables Custom Molder To Eliminate Reject Parts—And Once More Enjoy Sunday Evenings" of Maguire Products, Inc. dated Jun. 20, 2000.

Thirty–nine page brochure entitled "Maguire Low Pressure Dryer: Sep. 7, 2000: Installation Operation Maintenance".

Sheet of 2 photographs of Mould–Tek gravimetric blender, circa 1993.

Sheet of 2 photographs of Motan gravimetric blender and feeding system with Maguire Products, Inc. controls, circa 1993.

Sheet of 3 photographs of UNA–DYN gravimetric blender, circa 1993.

Sheet of 2 photographs of Maguire Producs, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solutions . . . Priced Right" by HydReclaim, circla 1993.

Advertisement entitled "New From HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Six page brochure entitled "Piovan Gravimetric Blenders MDW" published by Piovan Sri, Oct. 1993, Venezia, Italy.

Four page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Molders and Extruders" published by Maguire Products, Inc., 1995.

Two–sided color brochure entitled "NovaDrier® N Series Dryer" published by Novatec Inc., undated.

Two–sided color brochure entitled "Convey, Blend, Dry" published by Novatec, Inc., undated.

Forty–four page two–sided color brochure including cover and back pages entitled "Maguire: Auxiliary equipment for the plastics industry" Maguire Products, Inc., Oct. 2000.

Two page two–sided color brochure entitled "LPD Series Dryers: New Directions in drying technology" of Maguire Products, Inc., May 2000.

One page two–sided color brochure entitled "Drying Systems: WGR Gas Dryer Retrofit" of AEC Whitlock, 1997.

Two page two–sided color brochure entitled "Drying Systems: Mass Flow™ Series Drying Hoppers" of AEC Whitlock, 1998.

Four page color brochure entitled "Speedryer Thermodynamic Hopper Dryer" of Canam Manufactured Products Inc., Dec. 10, 2001.

Two page two–sided color brochure entitled "WDMR Series Compact Dryers" of AEC Whitlock, 1998.

Two page two–sided color reprint entitled "10 most frequently asked questions about Dryers" by Joseph Dziediz, AEC/Whitlock, from Plastics Technology, Jan. 1998.

Two page two–sided color brochure entitled "Drying Systems: WD Series High Capacity Dehumidifying Dryers" of AEC Whitlock, 1997.

Three page two–sided color brochure entitled "Portable Drying and Conveying Systems: Nomad™ Series Portable Dryers", AEC Whitlock, 1998.

Two page two–sided color brochure entitled "Drying Systems: WD Series Dehumidifying Dryers" of AEC Whitlock, 1997.

Five page two–sided color brochure entitled "AEC Auxiliaries As Primary", AEC, Inc., 1999.

International search report for PCT/US98/19464 (WO 99/15324).

International search report for PCT/US02/19294.

International Search Report for related application No. PCT/US2005/021851.

Written Opinion of the International Searching Authority for related application No. PCT/US2005/021851.

* cited by examiner

LOW PRESSURE DRYER

CROSS-REFERENCE TO RELATED APPLICATION

This application claims priority from application Ser. No. 60/212,112 filed Jun. 16, 2000 for "Low Pressure Dryer" pursuant to 35 U.S.C. 119 and 120.

A separate page containing this cross-reference designated Attachment A is enclosed for the Office's convenience.

BACKGROUND OF THE INVENTION

1. Field of the Invention

This invention relates to drying granular or powdery material, preferably granular resin material, prior to processing thereof into intermediate or finished products, preferably by extrusion or molding.

2. Description of the Prior Art

Plastic resins are initially granular materials and are produced in pellets. These pellets are processed into finished or semi-finished products by molding, extrusion or other means in which the granular resin pellets are heated until the pellets melt and may then be molded or extruded into a desired shape. Typically granular resins melt at elevated temperatures, for example from 300–400° F., which is well above the boiling point of water.

Many granular resins have affinity for moisture. These hydroscopic resins absorb moisture and cannot be properly processed by molding or extrusion until dried. If processed before dry, the granular resin is dry, moisture in the resin being processed into plastic boils at or approaching the high plastic molding or extrusion process temperatures, leaving bubbles and perhaps other imperfections in the finished product. Hence, hydroscopic granular resins must be dried prior to molding or extrusion.

It is known to dry granular resin material by placing the granular resin material pellets on large shallow trays to a depth of one or two inches, and putting those trays into ovens for several hours. With this approach to granular resin material drying, drying temperatures of up to 150–180° F. but no higher can be used since many granular resin materials begin to soften at 200–210° F.

During the drying process, the granular resin material cannot be permitted to soften, since it becomes unmanageable. Once granular resin material begins to soften, at temperatures above the boiling point of water, the granular resin material pellets stick together in lumps or even melt into useless masses of solid plastic, making it impossible to further process the resin material into a useful article.

U.S. Pat. No. 6,154,980 represents a substantial improvement in dryer technology providing methods and apparatus which substantially accelerate the drying process providing greater throughput of dried granular resin material at lower cost than known heretofore.

SUMMARY OF THE INVENTION

In one of its aspects, this invention provides improvements in low pressure granular or powdery material drying of the type disclosed in U.S. Pat. No. 6,154,980 in which the dryer preferably includes a rotatable preferably vertical shaft, a plurality of preferably vertically-oriented, open-ended preferably cylindrical canisters which are preferably equiangularly positioned on a carousel which rotates about a vertical axis preferably defined by the shaft, where the canisters are movable serially and unitarily at least among material heating and vacuum drying positions.

The dryer preferably further includes a vertically extending pin radially displaced from the axis, a preferably triangular preferably horizontal plate rotatably receiving the pin proximate the center of the plate, a preferably horizontal link pivotally connecting said shaft and the plate, and a plurality of preferably pneumatic piston-cylinder combinations equiangularly operatively connected to the plate for rotating the shaft by sequentially moving the plate relative to the shaft thereby to move the canisters among at least the heating and vacuum drying positions.

The dryer yet preferably further includes preferably pneumatic piston-cylinder actuated means for sealing the cylindrical canisters at the vacuum drying station.

In another of its aspects, this invention provides an improved, manually removable canister for use in a low pressure granular resin or powdery material dryer of the type broadly disclosed in U.S. Pat. No. 6,154,980 where the canister includes a preferably vertically-oriented preferably cylindrical shell having open ends with the canister preferably adapted to be sealingly closed by selectably contacting top and bottom plates thereagainst, thereby enabling vacuum to be drawn within the canister when desired. The canister further preferably includes a perforate funnel within the cylindrical canister and located proximate the shell bottom.

Top and bottom plates preferably selectably seal the cylindrical shell of the canister thereby allowing vacuum to be drawn therewithin at a vacuum drying station. Pneumatic piston-cylinder means are preferably provided for urging the top and bottom plates into sealing contact with the shell of the canister.

The canister is desirably adapted to selectably dispense granular or powdery material stored therewithin when the canister is at an inventory position. The inventory position is preferably different and removed from the vacuum drying position.

The canister is further preferably adapted to effectuate material dispensing upon contact by a downwardly moving rod, of a top-mounted pneumatic piston-cylinder combination, moving an open centered valve member into position at the bottom of the canister for maximum flow downwardly therethrough. When open, the valve permits relatively unimpeded, free downward flow of material out of the canister.

In yet another of its aspects, this invention provides a method for continuously batch drying granular or powdery material preparatory to mixing, molding, extruding or other processing of that material. The method preferably includes supplying granular or powdery material to a preferably vertically-oriented cylindrical shell of a canister and heating the material within the canister preferably by introduction of heated air into the canister at the bottom of the cylindrical shell of the canister and preferably also into the center of the material via an axially extending tube running at least part way along the axial length of the canister while at the heating position.

The method yet further preferably includes moving the vertically-oriented canister through an arc about a vertical axis outboard of the canister periphery to a vacuum drying position and sealing open ends of the canister at such position.

The method still yet further preferably includes drawing a preselected level of vacuum within the sealed canister for a time sufficient to evaporate moisture from the heated material within the canister to a desired degree of dryness and supplying one or more shots of heated air to the drying material within the canister while under vacuum.

The method even yet further preferably includes bringing the canister to an inventory position and then discharging the dried material from the canister responsively to action of a preferably pneumatic piston-cylinder combination located above the canister by opening a valve at the bottom of the canister.

The method preferably still yet even further includes moving the canister through an arc and sequentially repeating the steps of supplying material to the canister, heating the material within the canister by introducing heated air into the canister at an end thereof and further preferably into the midst of the material via a tube extending through the material within the canister, moving the canister to the vacuum drawing position, drawing a sufficient level of vacuum and applying at least one short shot or blast of heated air to the drying material within the canister, preferably close to the conclusion of the drying time, while vacuum is continued to be drawn within the canister to evaporate moisture from the material within the canister and then moving the canister to an inventory position, for so long as material is to be continuously dried.

In yet another of its aspects, this invention provides a method for continuously supplying dried granular resin material for processing from a supply of material which is excessively moist where the method preferably includes substantially simultaneously performing the steps of heating a portion of the moist granular resin material to a selected temperature at which moisture evaporates from the granular resin material at a preselected level of vacuum, drawing a preselected vacuum over a second portion of the granular resin material which has been heated to the selected temperature for time nearly sufficient to cause the moisture to evaporate therefrom and result in the second portion of granular resin material being at the preselected dryness while supplying at least one short burst of heated dry air preferably at the conclusion of the drying cycle to the drying material to achieve an even greater degree of dryness and supplying to granular resin material processing equipment from an inventory position a third portion of the granular resin material which was dried to the preselected dryness by evaporation in the preselected level of vacuum after having been heated to the selected temperature, and sequentially and repeatedly replacing each portion by the next succeeding portion.

In still another of its aspects this invention provides apparatus for drying granular or powdery material prior to molding or extrusion where the apparatus includes a first material processing chamber, a second material processing chamber, manifold means for furnishing material to be dried selectably to one of said first and second processing chambers preferably most recently having had dried material evacuated therefrom, means for heating material in a selected one of said first and second processing chambers into which material needing to be dried has been introduced, means for drawing vacuum over material in a selected one of said first and second processing chambers preferably having had said material most recently heated and means for withdrawing material from said chamber preferably having most recently dried material therein.

In yet another of its aspects this invention provides a method for drying granular powdery material prior to molding or extrusion where the method includes feeding a first portion of material to a first processing chamber, heating the material in the first processing chamber to a preselected temperature, drawing vacuum over the material in the first processing chamber, feeding a second portion of material to a second processing chamber, heating the material in the second processing chamber while the first portion of material has vacuum drawn thereover, withdrawing material from the first processing chamber when needed for molding or extrusion and drawing vacuum over the heated material in the second processing chamber thereby to evacuate moisture from said material and prepare such material for molding or extension.

In yet another of its aspects this invention provides a low pressure dryer for granular or powdery material where the dryer includes a frame, a cabinet supported by the frame and including an access door, a plurality of canisters carried by the frame within the cabinet and movable serially simultaneously at least among material heating and vacuum drying positions; and means for sensing when the door is open and responsively disabling the canister for movement.

In yet another of its aspects this invention provides a low pressure dryer for granular or powdery material where the dryer includes a frame, a plurality of canisters carried by the frame and moveable serially simultaneously among at least material heating and vacuum drying positions, a material holding and filling hopper supported by the frame above the material heating position, a valve between the material holding and filling hopper and the material heating position for permitting downward flow of material from the holding and filling hopper into a canister at the heating position and means for sensing presence of a canister at the material heating position and disabling the valve from opening in the absence of a canister thereat.

In yet another of its aspects this invention provides a method for supply of dried granular resin material for processing from a supply of material which is excessively moist where the method includes heating a portion of the moist material to a temperature at which moisture evaporates at a preselected level of vacuum, drawing at least the preselected level of vacuum over a second portion of the material which has been heated to a temperature for time sufficient to cause the moisture to evaporate therefrom and result in the second portion of material reaching a preselected dryness while periodically introducing hot air into the second portion of material under the preselected vacuum to purge moist air from around such material, and supplying to granular material processing equipment for molding or extrusion a third portion of the material which has been dried to the preselected dryness by moisture evaporation in the preselected level of vacuum after having been heated.

Figure 1:
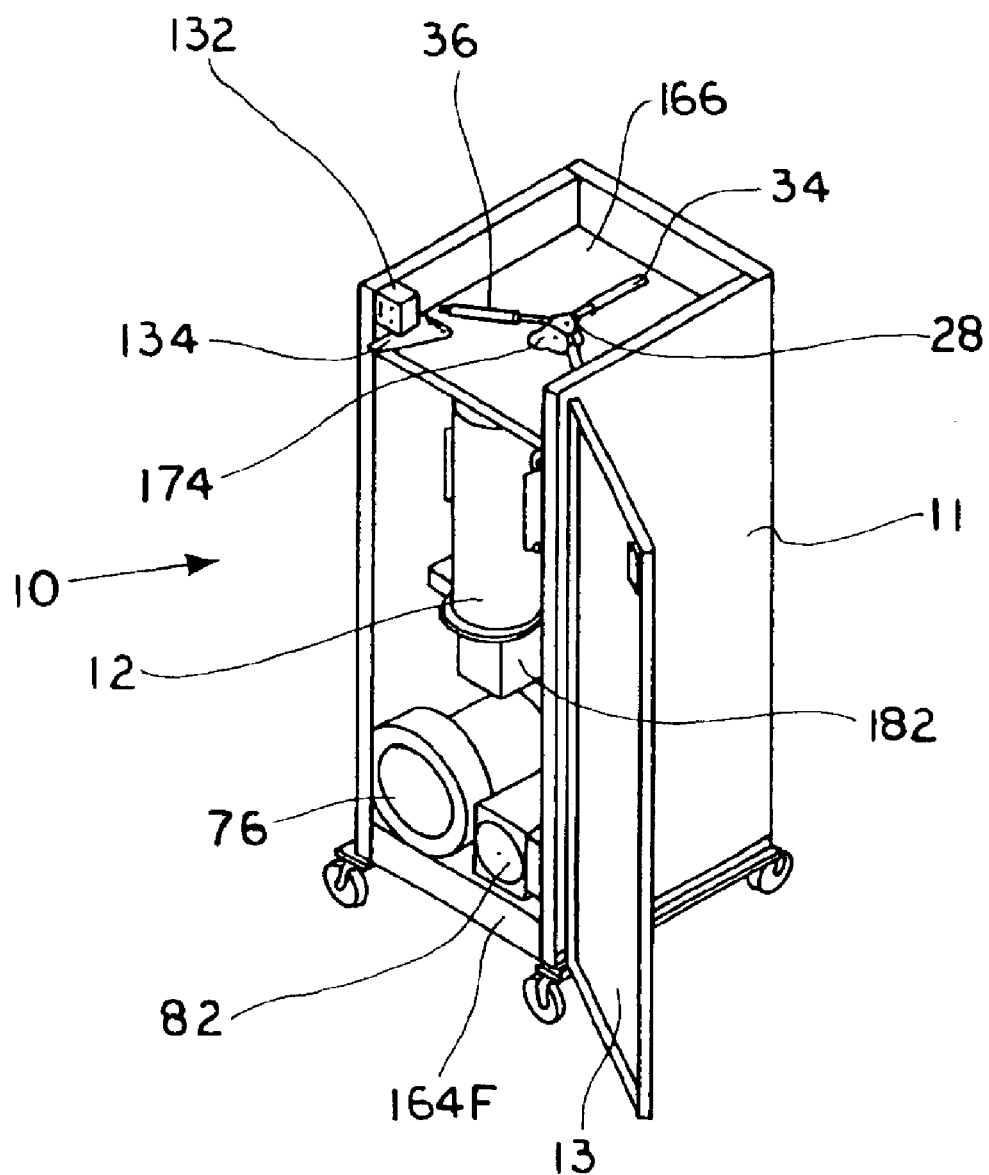
FIG. 1 is an isometric view of a low pressure vacuum dryer apparatus in accordance with the preferred embodiment of the invention.

DESCRIPTION OF THE PREFERRED EMBODIMENT AND BEST MODE KNOWN FOR PRACTICING THE INVENTION

Referring to the drawings in general and to FIGS. 1 through 4, 11 and 12 in particular, a low pressure granular material dryer manifesting aspects of the invention and of the type generally disclosed in U.S. Pat. No. 6,154,980 is designated generally 10 and preferably includes a plurality of preferably cylindrical canisters, preferably three, each of which has been designated generally 12. Each canister 12 preferably includes a cylindrical shell 14 and is preferably substantially vertically-oriented with the axis of the cylinder extending substantially vertically in order to be rotatable preferably unitarily with the other canisters about a substantially vertical axis defined by a preferably vertical shaft 24.

Figure 12:
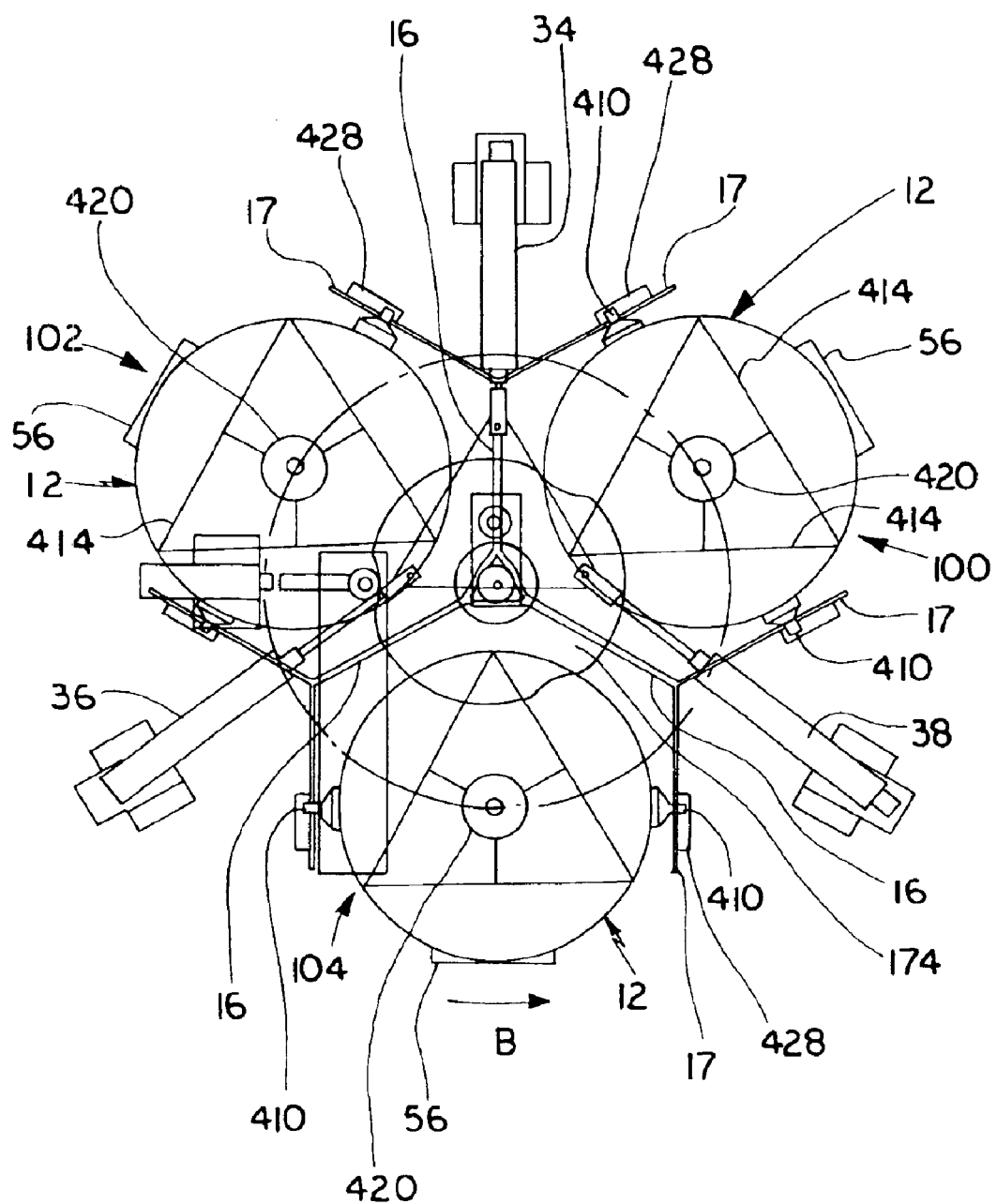
FIG. 12 is a schematic top view of the dryer illustrated in FIGS. 2 through 4 and 11 with certain parts deleted to enhance drawing clarity.

Dryer 10 includes a frame, designated generally 22, on and within which vertical shaft 24 is rotatably mounted for rotation relative to frame 22. Cylindrical canisters 12, riding on a carousel 21 rotating unitarily with vertical shaft 24, preferably move serially among a heating position designated generally 100, a vacuum drying position designated generally 102 and a material inventory position designated generally 104 as indicated in FIG. 12. Canisters 12 move when and as required among heating position 100, vacuum drying position 102 and inventory position 104. The three canisters 12 start and stop together as required due to movement of carousel 21; they do not move continuously in a merry-go-round fashion among positions 100, 102 and 104. Arrow B in FIG. 12 indicates the direction of rotation of carousel 21 and shaft 24.

Figure 2:
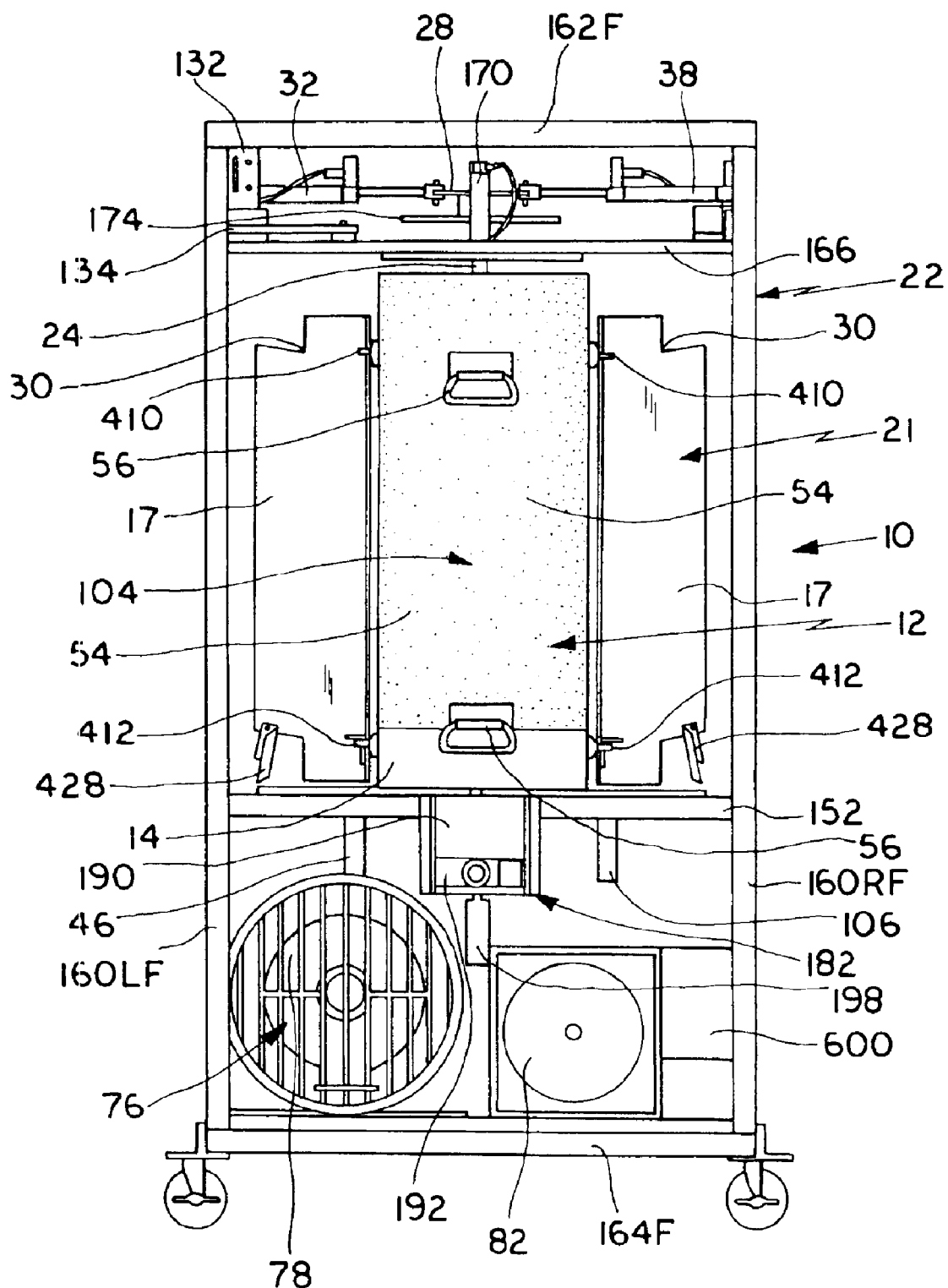
FIG. 2 is a front elevation of low pressure vacuum dryer apparatus in accordance with the preferred embodiment and best mode known for practicing the invention, with the cabinet removed and with certain of the conduits not shown to enhance drawing clarity.

Referring principally to FIGS. 1 through 4, frame 22 is preferably formed of a plurality of preferably vertically and preferably horizontally extending preferably angle iron members which preferably collectively define a rectangular parallelpiped. As visible in FIGS. 2, 3 and 4, frame 22 includes preferably four substantially vertical members 160, two of which are visible in FIG. 2; the remaining two substantially vertical members 160 are hidden behind the two members 160 visible in FIG. 2 but are visible in FIGS. 3 and 4. Vertical members 160 are additionally identified in the drawings according to whether those vertical members are on the left side or the right side of the dryer and whether those vertical members are at the front or the rear of the dryer. For example, in FIG. 2, showing the dryer viewed from the front, the vertical member visible on the left side of the drawing is numbered member 160LF denoting vertical member 160 "Left Front". Similarly, the vertical member on the right side in FIG. 2 is denoted 160RF for "Right Front". The same convention applies to the vertical members illustrated in FIGS. 3 and 4 where "LB" denotes "Left Back" and "RB" denotes "Right Back".

Figure 3:
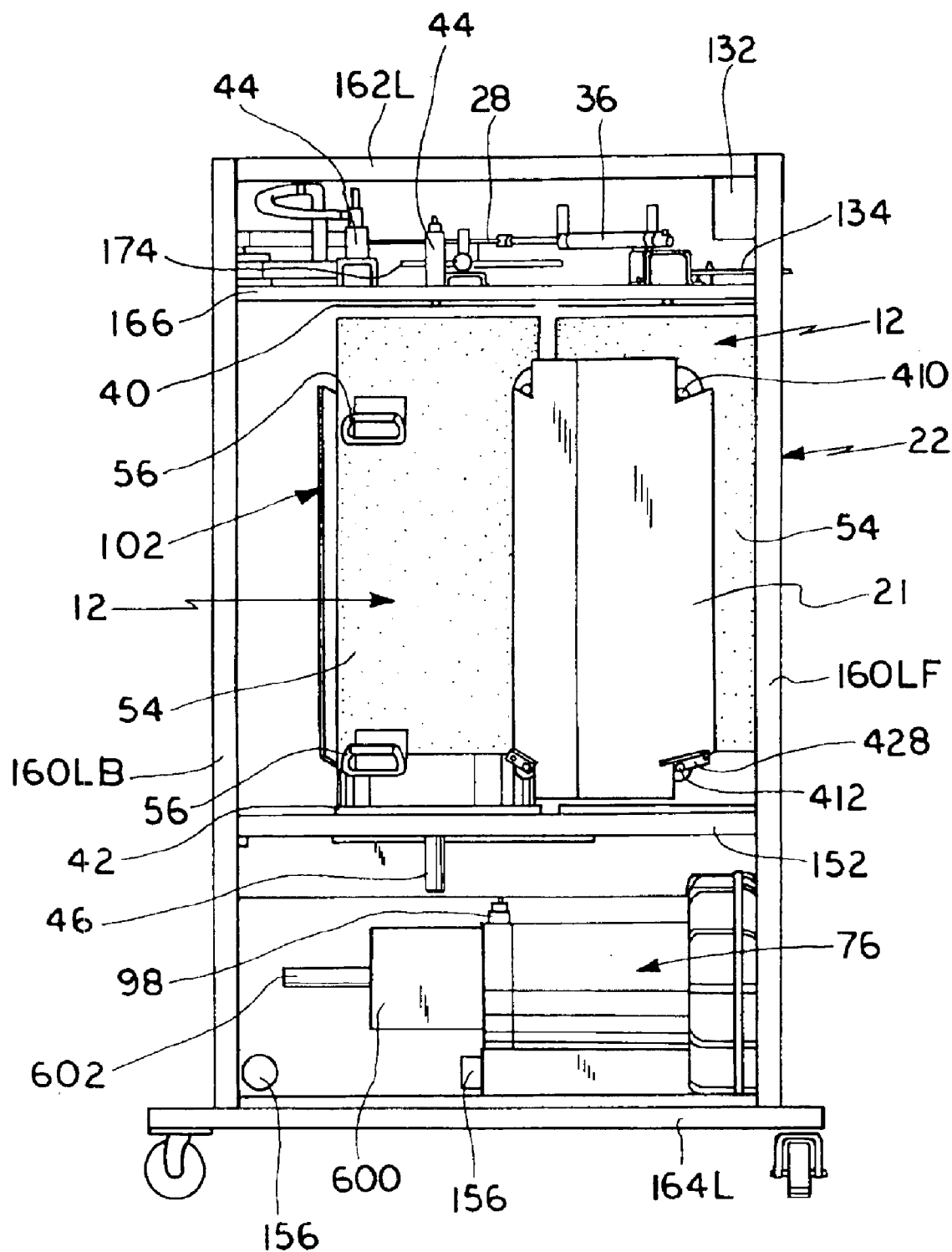
FIG. 3 is a left side elevation of the dryer apparatus illustrated in FIG. 2, with the cabinet removed and with certain of the conduits not shown to enhance drawing clarity.
Figure 4:
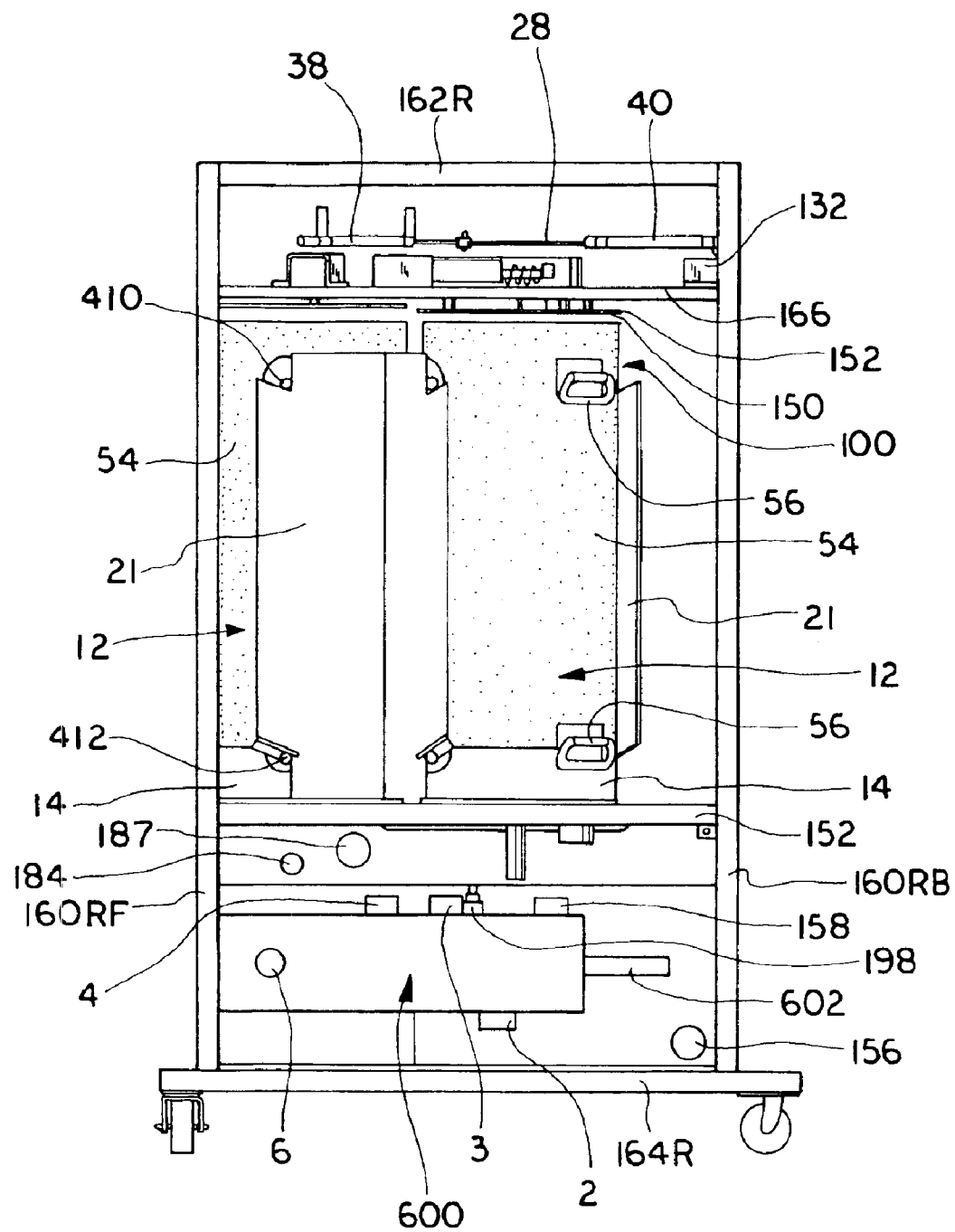
FIG. 4 is a right side elevation of the dryer apparatus illustrated in FIGS. 2 and 3, with the cabinet removed and with certain of the conduits not shown to enhance drawing clarity.

Frame 22 preferably further includes four upper horizontal members 162 which preferably collectively define the outer periphery of a rectangle in geometric terms; various ones of the four upper horizontal members 162 are visible in FIGS. 2, 3 and 4. Upper horizontal members 162 are additionally designated "L", "R", "F" and "B" for "Left", "Right", "Front" and "Back" respectively.

Frame 22 further yet preferably includes four lower horizontal members 164, various ones of which are visible in FIGS. 2, 3 and 4. Each of lower members 164 preferably lies immediately under a corresponding upper horizontal member 162 as illustrated in FIGS. 2, 3 and 4. The four lower horizontal members 164 preferably define the base of frame 22 for contacting a floor or other weight supporting structure on which dryer 10 rests or may be of extended length for mounting of wheels as illustrated in FIGS. 2, 3 and 4. Lower horizontal members 164 are additionally designated "L", "R", "F" and "B" for "Left", "Right", "Front" and "Back" respectively.

A preferably horizontal suspension plate 166 is part of frame 22 and preferably extends laterally across an upper portion of dryer 10, below upper horizontal members 162. Suspension plate 166 is illustrated in FIGS. 2, 3 and 4 and serves as mounting structure for various components. A canister top sealing piston-cylinder combination designated generally 44, serving to seal the top of a canister 12 at vacuum drying position 102, is preferably mounted on horizontally extending suspension plate 166 as illustrated in FIG. 3. Preferably there is no corresponding upper piston-cylinder combination or equivalent structure at heating position 100; the upper end of a cylindrical canister 12 at heating position 100 preferably remains slightly open with space between the upper extremity of canister 12 and a plate-like structure 150 which is associated with and fixedly connected to horizontally extending suspension plate 166, as illustrated in FIG. 4.

Figure 11:
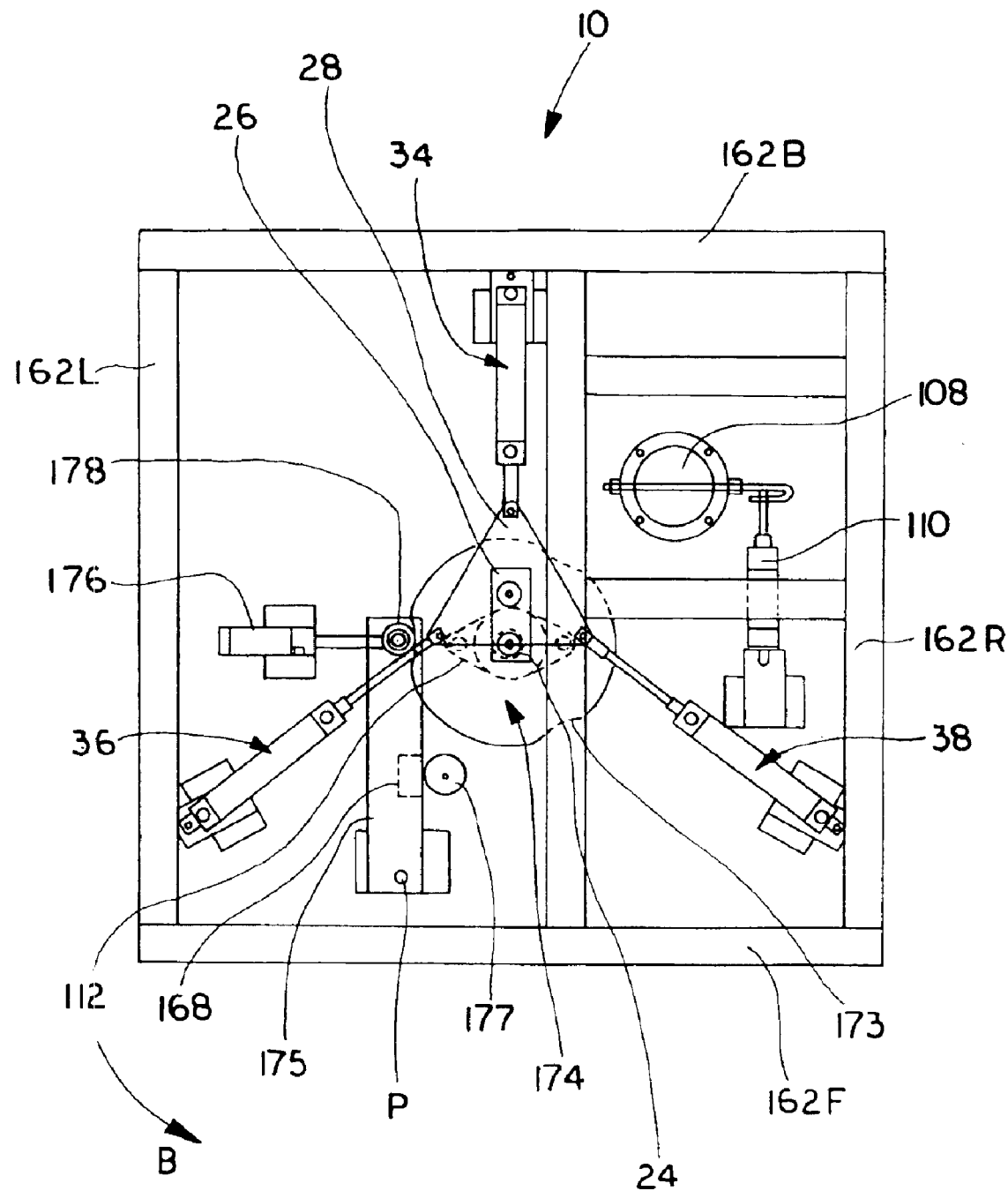
FIG. 11 is a top view of the dryer illustrated in FIGS. 2, 3 and 4.

First, second and third driving rotation piston-cylinder combinations 34, 36, 38 are preferably pivotally connected to suspension plate 166 as illustrated in FIGS. 2, 3, 4, 11 and 12. Connections of driving rotation piston-cylinder combinations 34, 36 and 38 to plate 166 forming a part of frame 22 are preferably pivotal and denoted as connections 180 in the drawings; pivotal connections 180 are preferably in a common plane on plate 166. Unnumbered rods of piston-cylinder combinations 34, 36, 38 are connected at their extremities remote from the associated cylinder to triangular plate 28 as illustrated in FIGS. 11 and 12.

Connection of a generally triangular plate 28 with vertically-oriented shaft 24 is preferably effectuated by means of a rectangular link 26 which is preferably horizontally elongated and preferably resides rotatably in a suitable bearing surface within a circular aperture formed at the center of generally triangular plate 28, as illustrated in FIGS. 11 and 12. Rectangular link 26 is preferably fixedly connected to vertical shaft 24 at the upper end thereof.

FIG. 11 is a top view of dryer 10 showing the structural connections of first, second and third driving rotation piston-cylinder combinations 34, 36, 38 and the associated structure which results in rotation of shaft 24 upon actuation of one of piston-cylinder combinations 34, 36, 38.

Each of piston-cylinder combinations 34, 36, 38 is affixed to one vertex of a triangular plate 28. Triangular plate 28 is in turn pivotally connected to a rectangular or longitudinally elongated pin-like extension 26 which, while shown in solid lines in the drawing figure for purposes of drawing clarity, should be understood to be positioned below triangular plate 28.

Pin-like extension 26 is secured at a portion thereof, remote from the position of securement to triangular plate 28, to vertical shaft 24. As a result, upon actuation of one of piston-cylinder combinations 34, 36, 38 with retraction of the associated piston-shaft resulting, such as illustrated for piston-cylinder combination 34 in FIG. 11, vertical shaft 24 rotates one hundred twenty degrees (120°) upon actuation of a given piston-cylinder combination. In FIG. 11, once piston-cylinder combination 36 is actuated to withdraw the piston rod portion of that piston-cylinder combination into the cylinder, this results in counterclockwise rotation of shaft 24 through an angle of one hundred twenty degrees (120°) thereby moving canisters 12 in an indexing fashion to the next successive one of heating and filling position 100, vacuum drying position 102 and inventory position 104.

Piston-cylinder combinations are rotatably mounted, as depicted in FIG. 11, on suspension plate 166.

Still referring to FIG. 11 and to FIG. 12 as well, dryer 10 preferably includes a carousel locking cam 174 which is in the form of a flat-plate having three lobes 179 where adjacent lobes meet at concave vertices designated 173 in FIG. 11. For drawing clarity, not all vertices 173 and not all lobes 179 have been numbered.

Carousel locking cam 174 is fixedly connected to shaft 24 and rotates unitarily therewith. A carousel locking arm 175 is mounted on suspension plate 166 and is movable pivotally about a point of pivotal motion denoted P in FIG. 11 responsively to a piston-cylinder combination 176 also mounted on suspension plate 166. A roller serving as a cam follower 178 is mounted on carousel locking arm 175 and is rotatable about a vertical axis. Cam follower 178 fits against the outwardly projecting radially extending edge of carousel locking cam 174 and rides along convex lobes 179 and concave vertices 173 defining the radially outboard surface of locking cam 174.

When it is desired to lock carousel 21 against rotational movement, piston-cylinder combination 176 is actuated preferably at the next occurrence of cam follower 178 residing against a concave vertex 173. With piston-cylinder combination 176 actuated in this manner, force exerted by piston-cylinder combination 176 against a concave vertex 173 of locking cam 174 via cam follower 178 precludes any rotational motion of cam 174 and hence precludes any rotation of shaft 24 and carousel 21 carried thereby.

A vertically oriented roller 177 is preferably eccentrically mounted on suspension plate 166 and is positioned for actuating a limit switch carried by carousel locking arm 175. The limit switch has been denoted by dotted lines and number 168 in FIG. 11. Since position adjuster 177 is eccentrically mounted, rotation of adjuster 177 about its axis serves to adjust the limit of arcuate motion of carousel locking arm 175. Contact of the limit switch against position adjuster 177 sends a signal to the microprocessor indicating that actuation of piston-cylinder combination 176 has effectuated locking of carousel 21 against rotational movement.

With this arrangement, movement of triangular plate 28, as effectuated by any of first, second or third driving rotation piston-cylinder combinations 34, 36 or 38, results in rectangular link 26 translating such motion to vertical shaft 24, resulting in shaft 24 rotating. As vertical shaft 24 rotates, it carries carousel 21 and hence canisters 12 among heating position 100, vacuum drying position 102 and inventory position 104 as depicted schematically in FIG. 12. Canisters 12 move this way unitarily with shaft 24 as a result of canisters 12 being carried by carousel 21 which is connected to shaft 24. Each one of piston-cylinder combinations 34, 36 and 38 preferably actuates only to withdraw the associated piston rod into the cylinder of the piston-cylinder combination. Withdrawal of the piston rod into the cylinder of a given piston-cylinder combination 34, 36 or 38 serves to rotate carousel 21 through an angle of 120°. When any one of piston-cylinder combinations 34, 36 and 38 is energized, the remaining two piston-cylinder combinations are de-energized; this control is effectuated by a microprocessor actuating solenoid valves which in turn control flow of pressurized air to piston-cylinder combinations 34, 36 and 38 and to other piston-cylinder combinations associated with the vacuum dryer. The solenoid valves are pneumatically connected to appropriate ones of the piston-cylinder combinations via flexible plastic tubing. The tubing, solenoid valves and microprocessor have not been substantially illustrated in the drawings to aid drawing clarity The piston-cylinder combinations are desirably spring biased to return to a desired default position when not pneumatically actuated.

Figure 5:
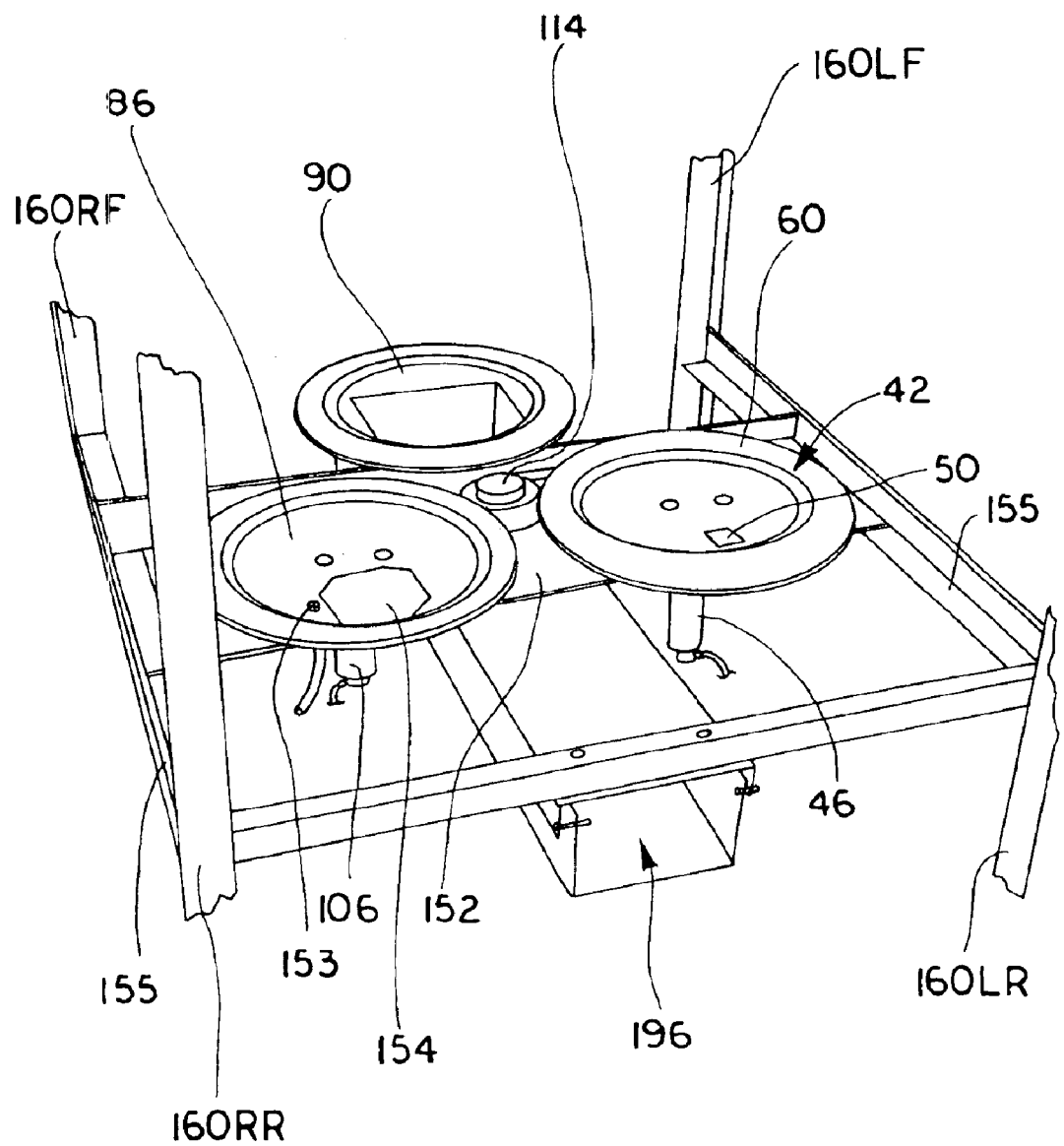
FIG. 5 is a broken isometric view of a portion of the frame of the dryer illustrated in FIGS. 2, 3 and 4, showing details of structure for closing the bottoms of the canisters at the material filling and heating, vacuum drying and inventory and discharge positions.

Shaft 24 or equivalent structure is preferably journaled in suitable bearings mounted on upper shaft suspension 112. Upper shaft suspension 112 is preferably connected to horizontally extending suspension plate 166 by suitable nut and bolt combinations which have not been numbered but are depicted in FIG. 11. A lower shaft support bearing preferably in the form of a shouldered plate 114 is mounted on lower horizontal framing cross member 165 as shown in FIG. 5, and secured in place by suitable nut and bolt combinations, or adhesive; such securing means have not been shown or numbered in the drawings. Shaft 24 rides rotatably on shouldered plate 114 which is preferably bearing-grade plastic.

FIG. 1 illustrates that dryer 10 manifesting aspects of the invention is housed within a cabinet 11 having a door 13. Within cabinet 11 are a plurality of canisters 12, one of which is visible in FIG. 1, a blower 76, an air filter 82 and other components of the dryer as discussed in more detail below.

First and second driving rotation piston-cylinder combinations 34, 36 are illustrated at the top of cabinet 11 above a horizontal suspension plate 166.

A contact switch 132 is mounted at the position illustrated in FIG. 1 and senses whether door 13 is closed or open. When door 13 is open, contact switch 132 preferably sends a signal to a microprocessor which controls operation of dryer 10 with such signal serving to disable the dryer moving parts from any motion thereby providing a safety feature.

There is further illustrated in FIG. 1 a triangular template 134 which is manually moveable and which fits over a manual switch serving as an interlock for the pneumatic feed piston-cylinder combinations 170 and 198. Triangular template 134, when moved by an operator, throws a manual switch disabling the pneumatic circuitry for piston-cylinder combinations 170 and 198 thereby enabling an operator to manually remove a canister 12 from material inventory position 104. Reverse manual movement of template 134 by an operator (or the action of closing door 13 if the operator forgets to move template 134 back to the operating position) moves template 134 back into position whereby template 134 throws a switch serving to reactuate the pneumatic drive circuit for piston-cylinder combinations 170 and 198.

A valve is preferably provided within and at the bottom of each canister 12, preferably in a canister discharge aperture 144, and is preferably operated at inventory position 104 by a piston-cylinder combination 170 mounted on horizontally extending suspension plate 162 located above inventory position 104 as shown in FIG. 2.

Figure 13:
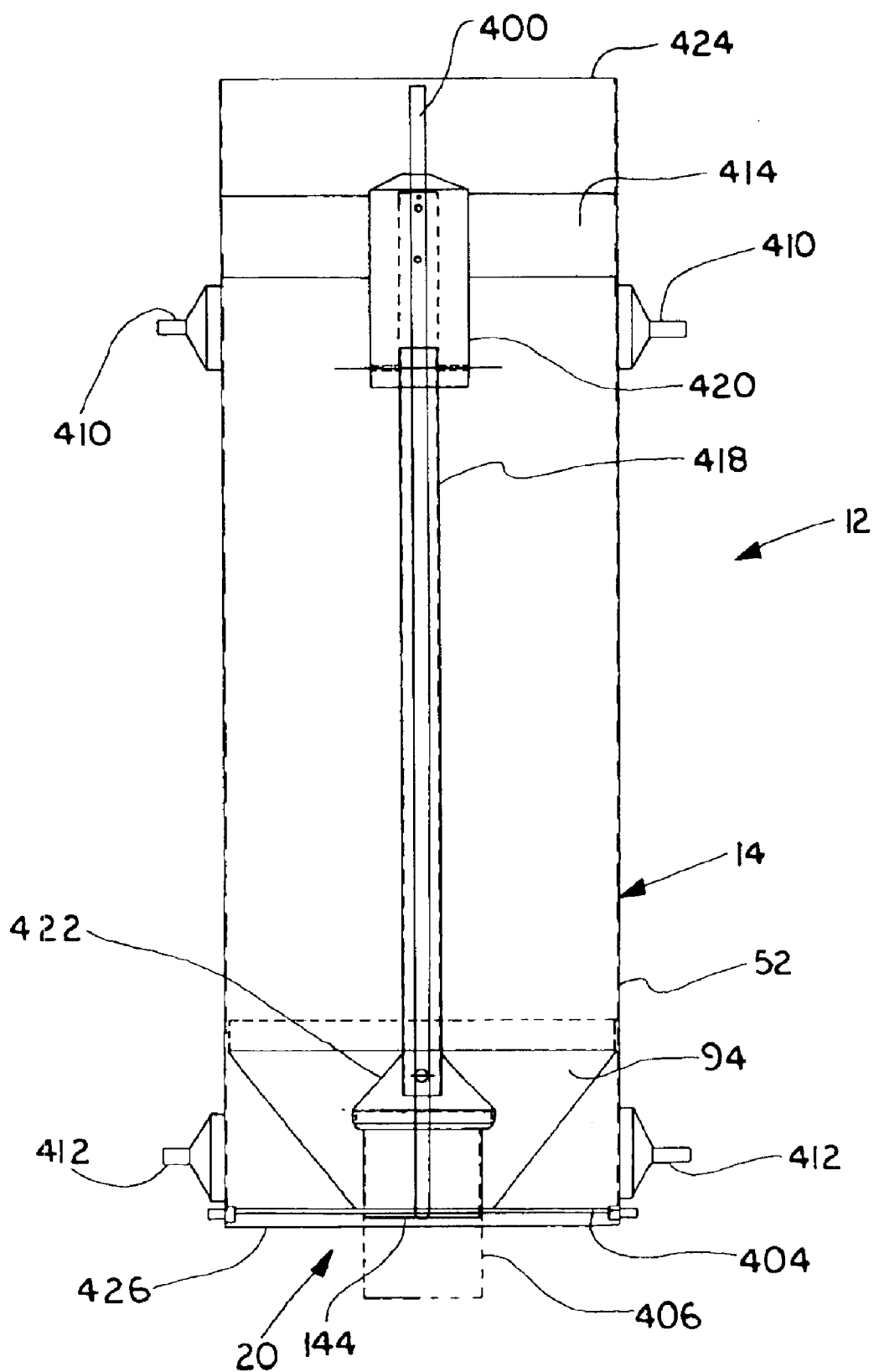
FIG. 13 is a front elevation in section of a canister manifesting aspects of the preferred embodiment and best mode known for practicing the invention.

Details of a canister 12 are illustrated in FIG. 13 in which cylindrical shell 14 is shown in vertical section with tube 52 forming shell 14. A canister discharge valve stem shaft 400 runs vertically the length of canister 12 and coincident with the axis thereof. Canister 12 further preferably includes an apertured plate 404 which is within canister 12 proximate canister lower end 426. Canister 12 further preferably includes an axially displaceable discharge valve cylinder 406 which is moveable unitarily with shaft 400 from the position illustrated in solid lines to the position illustrated in dotted lines in FIG. 13. When discharge valve cylinder 406 is in the upper position illustrated in solid lines, the canister dispense valve 20 is closed.

Figure 7:
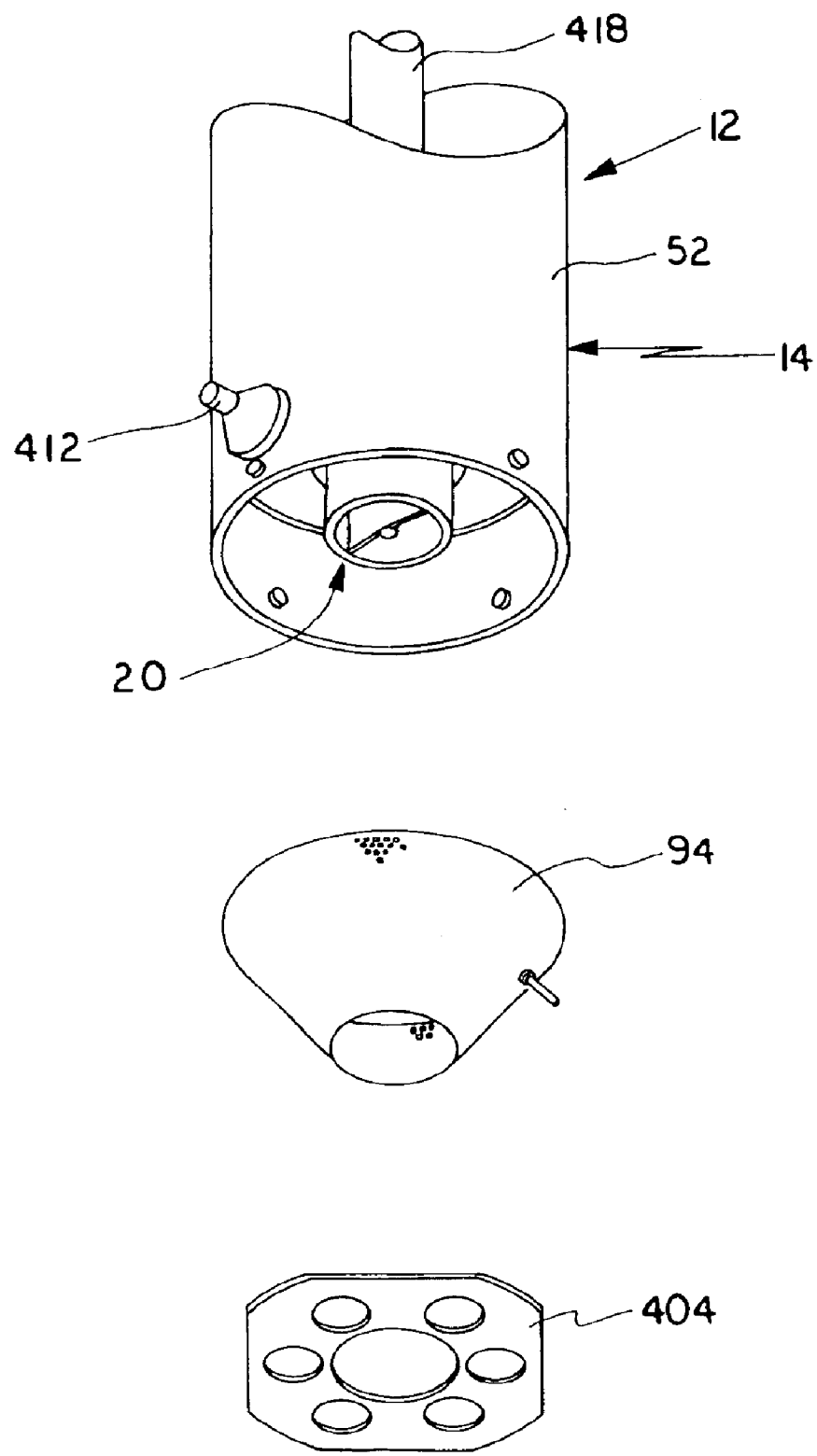
FIG. 7 is an exploded broken isometric view of a portion of a canister embodying aspects of the invention for use in a dryer such as illustrated in FIGS. 2 through 5 manifesting the invention.

The curved cylindrical wall of discharge valve cylinder 406 fits closely within a central aperture 405 of plate 404 illustrated in FIGS. 7 and 13. Perforate downwardly opening funnel 94 fits at its narrow end against plate 404 just outside the periphery of central aperture 405. Hence, granular material within canister 12 is vertically supported by perforate downwardly opening funnel 94 and cannot escape therefrom through the central opening since such central opening 405 is occupied by the axially displaceable discharge valve cylinder 406.

At this valve closed position, an upper end of axially displaceable discharge valve cylinder 406 fits closely against and is covered by a canister discharge valve umbrella 422 which is preferably fixedly connected to an internal heat tube 418 within canister 12. As a result of this geometric configuration, granular material within canister 12 rests on perforate funnel 94 and on discharge valve umbrella 422. No downward flow of such material can occur so long as axially displaceable discharge valve cylinder 406 is in the upper position illustrated in solid lines in FIG. 13. Slope of the top surface of the granular resin material in canister 12 and elsewhere is limited by the angle of repose.

When it is desired to discharge material from a canister 12, while canister 12 is at the material inventory position, actuation of piston-cylinder combination 170 lowers canister lid 172 at inventory position 104 into contact with the upper surface of canister 12. As a result, canister lid 172 and specifically the piston rod of piston-cylinder combination 170 interferingly contacts the upper end of canister discharge valve stem shaft 400, forcing shaft 400 downwardly considering FIG. 13. Downward movement of shaft 400 results in downward movement of axially displaceable discharge valve cylinder 406, moving the open top portion of axially displaceable discharge valve cylinder 406 away from canister discharge valve umbrella 422. This permits flow of granular material, which is within canister 12 and supported by perforate downwardly opening funnel 94, through the open interior of axially displaceable discharge valve cylinder 406 downwardly out of canister 12.

When it is desired to stop material flow out of canister 12 at inventory position 104, piston-cylinder combination 170 is de-energized whereupon a spring component of piston-cylinder combination 170 causes the piston portion thereof to retract thereby lifting canister lid 172. This releases canister discharge valve stem shaft 400, permitting shaft 400 to move upwardly in FIG. 13. A spring within housing 420 urges shaft 400 upwardly until the upper portion of axially displaceable discharge valve cylinder 406 once again contacts the lower interior of canister discharge valve umbrella 422 thereby positioning the curved surface of valve cylinder 406 for blocking any additional flow of granular material downwardly out of canister 12. Housing 420 is retained in position by three gussets 414 connecting housing 420 to the shell 14 of canister 12.

A major advantage provided by the design of canister dispense valve 20 is that valve 20 is not prone to jamming in an open or closed position due to particulate granular material being caught in the moving parts thereof. The sliding action of the cylindrical wall of axially displaceable discharge valve cylinder 406 against the corresponding annular wall of aperture 405 in plate 404 means that there is no space between these two moving parts into which granular material can easily fall and thereby jam the valve.

Referring to FIGS. 2 through 5 and 12, at heat position 100 a canister 12 has a supply of moist granular or powdery material, which is to be dried, resident therein.

As shown in FIG. 4, mounted on the lower side of suspension plate 166 and positioned to fit closely but slightly spaced from and around the outer periphery of the canister top is a preferably circular plate structure 150. An annular lip portion 152 of plate structure 150 fits closely to but is slightly spaced from the circular periphery of a canister 12 at fill and heating position 100. An aperture 154 leading to a conduit 157 is within plate structure 150 and facilitates communication between a material fill hopper 500 (see FIG. 14) or equivalent structure, positioned on the top of dryer 10, and the interior of a canister 12 at fill and heating position 100

A canister 12 arrives at heating position 100 as a result of having been moved to that position by rotation of carousel 21 on vertical shaft 24 in response to motion of one of first, second and third driving rotation piston-cylinder combinations 34, 36 and 38.

Figure 6:
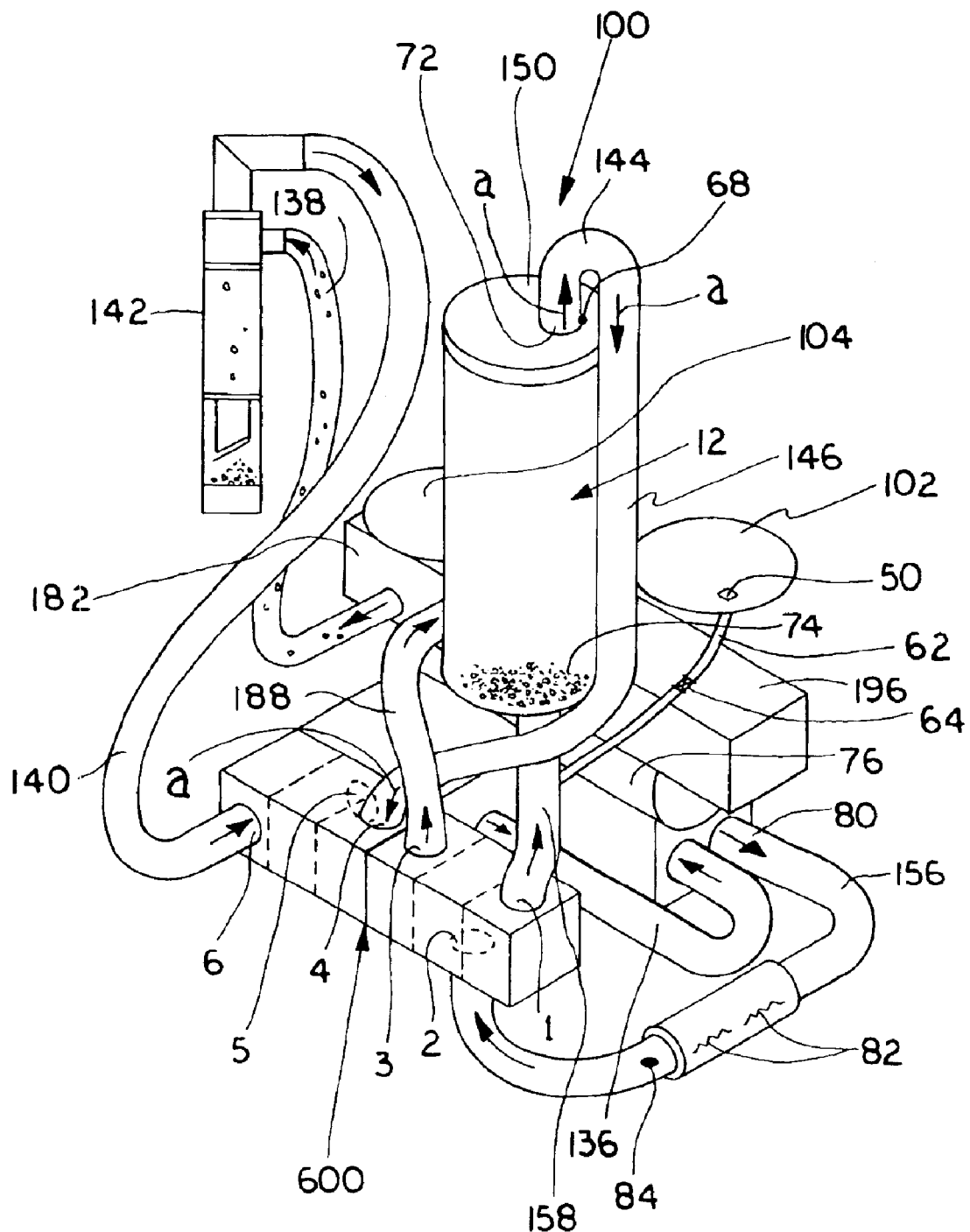
FIG. 6 is a schematic isometric depiction of air flows in a dryer in accordance with FIGS. 2 through 5 supplying material for use by a process machine such as a molding press or an extruder.

As illustrated schematically in FIG. 6, at heating position 100, a blower 76 facilitates circulation of heated air through material 74 resident within canister 12 to heat material 74. Blower 76 has an intake aperture 78 and an exhaust aperture 80. Exhaust aperture 80 connects to conduit 156 within which there are a plurality of heater elements 82 to heat air from blower 76 prior to flow through material within canister 12.

Referring to FIG. 5, a pneumatic piston-cylinder combination 106 is mounted on a lower cross-member 152, forming a part of frame 22. When actuated, piston-cylinder combination 106 serves to close the bottom of canister 12 in the fill and heat position by moving a heating position bottom sealing plate 86 vertically upwardly thereby effectuating a tight seal between plate 86 and canister 12 at fill and heating position 100 to facilitate passage of heated air through granular or powdery material in canister 12.

Heating position bottom sealing plate 86 further includes a canister presence sensor 153 as illustrated in FIG. 5. Sensor 153 detects the presence of a canister 12 in position on heating position bottom sealing plate 86. If no canister is sensed as present, canister presence sensor 153 sends a signal to the microprocessor which, as a result of logic programmed thereinto, precludes any downward flow of granular resin material to be heated at position 100 by actuating a piston-cylinder combination 110 controlling a valve 108 mounted on suspension plate 166 above heating position 100, as illustrated in FIG. 4. When valve 108 is actuated, no material can pass downwardly therethrough from a feed hopper above dryer 10 into space defining heating position 100.

Heating position bottom sealing plate 86 further includes a preferably screened aperture 154 for passage of heated air therethrough upwardly into a canister 12 positioned on heating position bottom sealing plate 86. Aperture 154 is connected to the exhaust outlet of blower 76 via a series of conduits with conduit 158 being directly connected to heated air aperture 154 as illustrated in FIG. 6.

Still referring to FIG. 5, lower cross member 152 is mounted between two intermediate horizontally extending cross members 155.

Heated air, having passed through granular or powdery material within canister 12, exhausts from canister 12 at the upper end thereof. While heating position bottom sealing plate 86 fits tightly against the bottom of canister 12 at heating position 100, canister 12 is slightly open at the top when located at heating position 100 due to the positioning of plate structure 150 fitting close to but slightly spaced from the upper edge of canister 12, as illustrated in FIG. 4.

Referring to FIG. 6, a discharge conduit 144 is connected tightly to an aperture in plate structure 150 for passage therethrough of heated air from canister 12 in heating position 100 after the heated air has passed through the moist granular or powdery plastic resin material within canister 12. Discharge conduit 144 preferably leads to a duplex pneumatic valve box 600 illustrated in FIGS. 15 and 16 and described in more detail below. Direction of air flow within discharge conduit 144 is indicated by arrows "a" in FIG. 6.

As shown in FIG. 6, a first thermocouple 68 preferably positioned at the inlet 72 to discharge conduit 144 senses temperature of heated air leaving canister 12. A second thermocouple 84 is preferably positioned proximate the outlet of the heated air supplied by blower 76, at a position after the heated air has passed along heating elements 82. When the temperatures sensed by thermocouples 68 and 84 are substantially equal, this is indicative of the granular or powdery resin material within canister 12 having reached the desired temperature, which typically but not necessarily is the selected temperature of the air entering canister 12 after having been heated to the desired degree selectably by heating elements 82.

Illustrated in FIG. 5 is a canister bottom sealing plate 42 located at vacuum drying position 102. Plate 42 is movably mounted on lower cross member 152 in a manner similar to that of heating position bottom sealing plate 86. Canister bottom sealing plate 42 at vacuum position 102 is actuated by a piston-cylinder combination 46 which is connected to lower cross member 152 and visible in FIG. 5.

Further illustrated in FIG. 5 is shouldered plate 114 which is fixedly connected to lower cross member 152 and serves as a bearing surface to support vertical shaft 24 as shaft 24 rotates and carries the canisters among the heating, vacuum drying and inventory positions.

Figure 9:
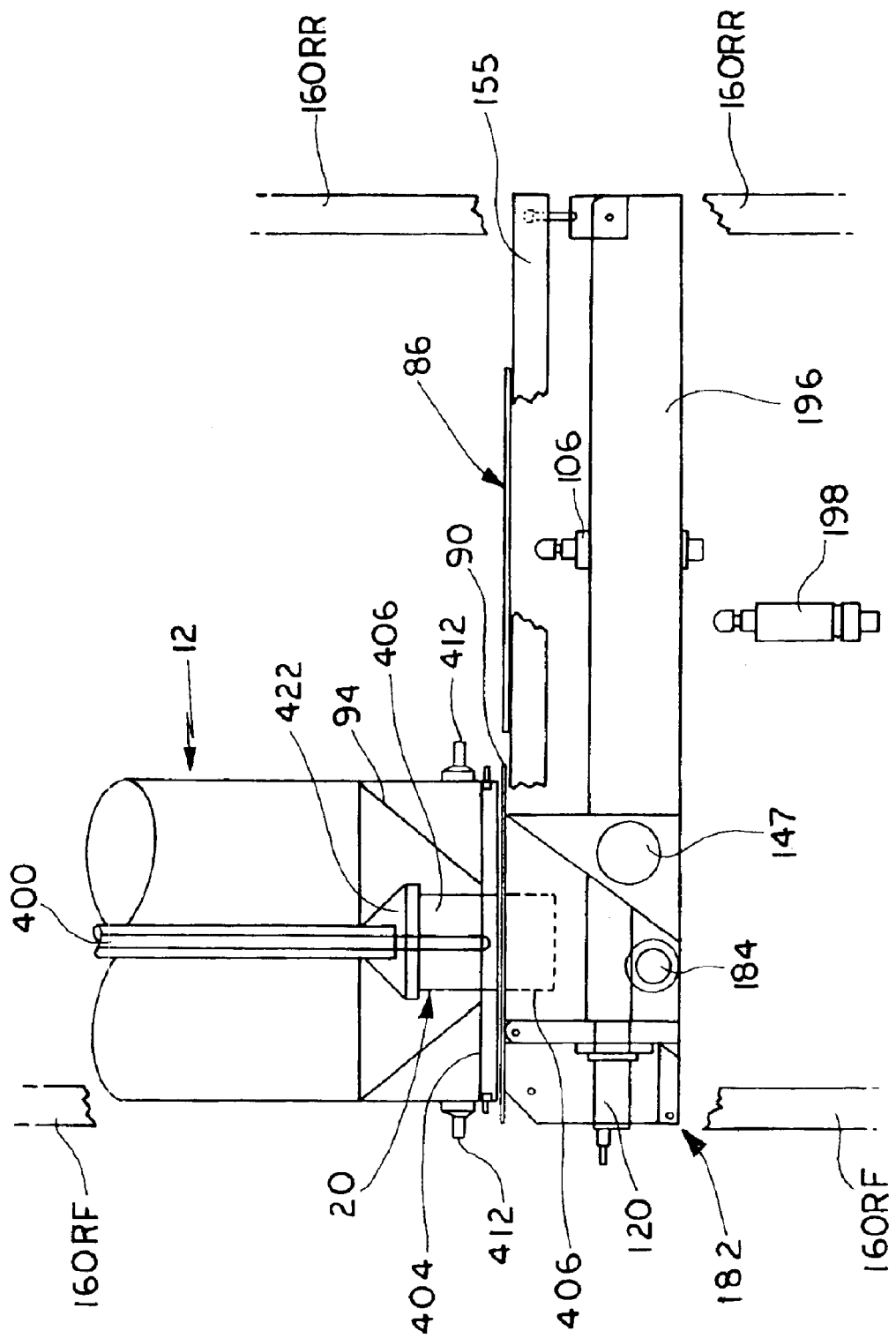
FIG. 9 is a broken side view of the vacuum material takeoff box and lower portion of the canister at the material inventory discharge position illustrated in FIG. 8.

Still further illustrated in FIG. 5 is an inventory position bottom sealing plate 90 which is movable vertically to contact the bottom of a canister 12 located at the inventory position, to receive downwardly flowing dried material from the canister for delivery to an extrusion machine or molding press. Inventory position bottom sealing plate 90 is preferably mounted on a beam 196 which pivots to facilitate vertical movement of inventory position bottom sealing plate 90; alternatively, inventory position bottom sealing plate 90 may be connected directly to frame 22 and actuated by a pneumatic piston-cylinder combination associated therewith. Beam 196 is illustrated in FIG. 9.

Referring to FIGS. 7 and 13, each preferably cylindrical canister 12 preferably includes a cylindrical shell designated generally 14. Each cylindrical shell 14 is preferably defined by a single wall tube designated 52 in the drawings. An insulative jacket 54, depicted in FIGS. 2, 3 and 4, preferably fits about the annular exterior of tube 52 and is equipped with a zipper 55 extending axially the length of jacket 54 when jacket 54 is in place about tube 52. Jacket 54 is sufficiently resilient that when zipper 55 is closed, jacket 54 stretches slightly circumferentially about tube 52 with the resulting radially inwardly force on tube 52 exerted by jacket 54 retaining jacket 54 in position around the exterior of tube 52.

A perforate downwardly opening material funnel designated 94 is secured within each cylindrical shell 14 of a canister 12 proximate the bottom of canister 12. Material dispensing funnel 94 when installed is preferably deformed just enough to be snapped into place and retained by the spring-like action created by the residual internal stresses as funnel 94 seeks to relieve those stresses.

The perforate character of dispensing funnel 94 facilitates circulation of heated drying air axially through material in canister 12 at heating position 100 and further facilitates drying of the material in canister 12 when the canister is at vacuum drying position 102 by axial draw of vacuum in canister 12 at position 102.

Each canister 12 preferably further includes a canister dispense valve designated generally 20 located coaxially with perforate funnel 94.

Referring to FIGS. 2, 3, 4, 12, 13 and 17, each canister 12 is equipped with a pair of upper outrigger pins 410 and a pair of lower outrigger pins 412 where pins of pairs 410, 412 are positioned at diametrically opposite locations on the surface of a given canister 12.

Carousel 21 includes a first set of vertically elongated equiangularly spaced blades where blades of the first set are denoted 16 in FIG. 12. Carousel 21 further includes a plurality of second sets of vertically elongated blades where the blades of each of the second sets are connected to respective blades of the first set along respective edges. Blades of the second set are denoted 17 in FIG. 12 are also depicted in FIGS. 2, 3 and 4. Blades of respective second sets 17 and the associated connected blade of the first set 16 to which the second set blades are connected are equiangularly spaced as shown in FIG. 12.

Each one of second blades 17 of carousel 21 have shaped edges proximate the upper extremities thereof to provide an upper canister support vertex designated 30 in FIG. 2. Vertex 30 is formed between a preferably vertically extending edge and an edge which extends slightly upwardly from the horizontal. The shape is illustrated in FIG. 2 and provides support for canister upper outrigger pins 410 when a canister, such as canister 12 illustrated in FIG. 2, is placed in position with upper outrigger pins 410 resting in upper canister support vertices 30.

Figure 17:
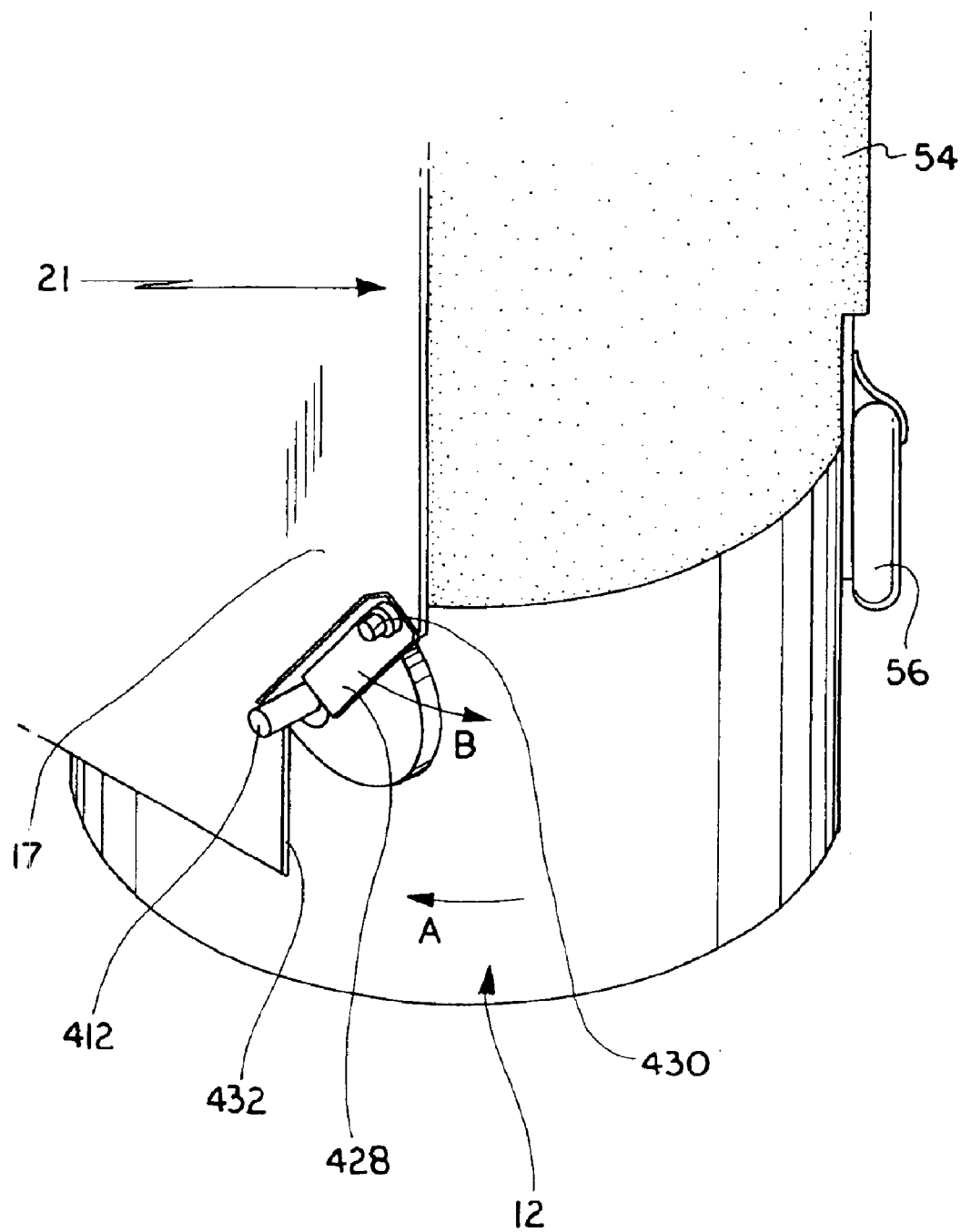
FIG. 17 is an isometric depiction of a self-actuating mechanical lock retaining a canister in position on a carousel of the dryer illustrated in FIGS. 2 through 4.
Figure 18:
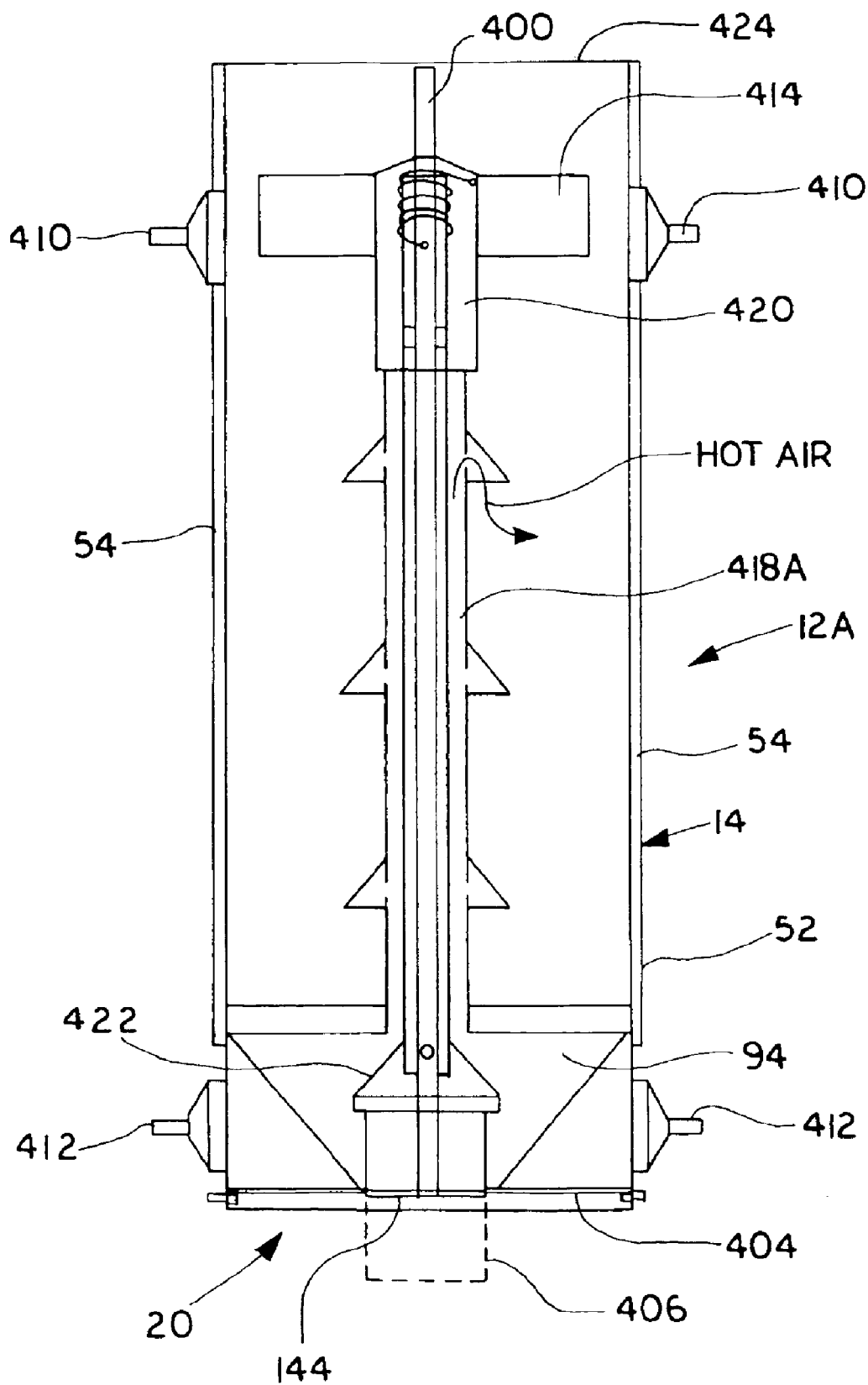
FIG. 18 is a front elevation in section of an alternate embodiment of a canister portion of the dryer.
Figure 19:
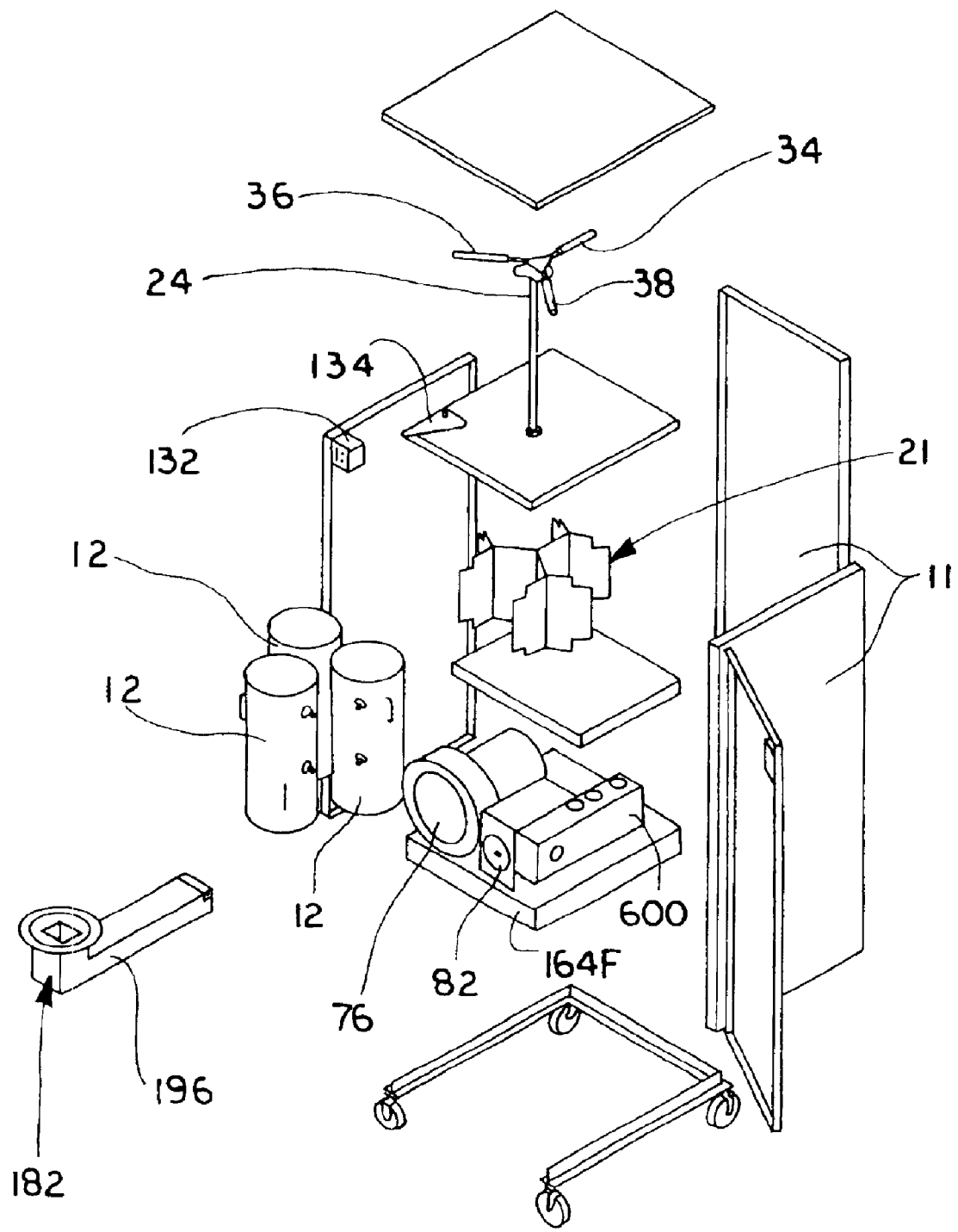
FIG. 19 is an exploded view corresponding to FIG. 1.

Once a canister has been positioned with upper outrigger pins 41 supported by upper canister support vertices 30, the lower portion of the canister may be swung into position by movement in a direction indicated by arrow A in FIG. 17. Such movement is pivoting movement through an arc with the center of the arc defined by canister upper outrigger pins 410 resting in vertices 30. Once canister 21 is swung into position with lower outrigger pins 412 residing in downwardly opening notches 432 formed in second blades 17, latching blade 428 is swung into the position illustrated in FIG. 17 from the position illustrated in FIG. 2.

At the position illustrated in FIG. 17, a first portion of latching blade 428 which lies in a plane perpendicular to the axis of canister lower outrigger pin 412 has an edge extremity 434 which is remote from blade pivot mounting 430 and which lies against the curved cylindrical surface of canister lower outrigger pin 412. At this position a second portion 438 of latching blade 428 is perpendicular to first portion 436 of latching blade 428 and extends longitudinally past edge extremity 434 of first portion of latching blade 428. This extension portion lies facingly against the curved cylindrical surface of canister lower outrigger pin 412, as illustrated in FIG. 17, thereby precluding rotation of latching blade 428 about pivot mounting 430. Since in this position latching blade 428 is precluded from rotation, force exerted by canister 21 via canister lower outrigger pin 412 against edge extremity 434 of first portion of latching blade 428 serves to retain canister 12 against any motion. Specifically, latching blade 428 cannot move in an arc about pivot mounting 430 in the direction of arrow B due to interference between second portion 438 of latching blade 428 and the curved cylindrical surface of canister lower outrigger pin 412.

When it is desired to remove canister 12 from carousel 21, latching blades 428 are rotated in the direction opposite that indicated by arrow B in FIG. 17 thereby releasing canister lower outrigger pins 412 and permitting canister 12 to be rotated in the direction opposite that of arrow A in FIG. 17. Once canister 12 has been slightly so-rotated to release lower outrigger ping 412 from downward opening notches 432, canister 12 may be lifted manually, so that canister upper outrigger pins 410 no longer rest on vertices 30 of second blades 17, and removed from dryer 10.

FIG. 3 illustrates a canister 12 at vacuum drying position 102 prior to movement of canister top and bottom vacuum sealing plates 40, 42 into position to seal cylindrical shell 14 so that a vacuum may be drawn therewithin.

Canister top and bottom vacuum sealing plates 40, 42 are preferably respectively connected to unnumbered piston rod extensions which are parts of canister top and bottom sealing piston-cylinder combinations 44, 46 respectively. Piston-cylinder combinations 44, 46 are preferably pneumatically actuated by the microprocessor and solenoid valves as described above. The cylinder portion of top piston-cylinder combination 44 is fixedly connected to suspension plate 166 while the cylinder portion of bottom piston-cylinder combination 46 is fixedly connected to a lower cross member 152 of frame 22, in a manner similar to that of the piston-cylinder combination which actuates movable lower plate 86 at heating and fill position 100, as illustrated in FIG. 5.

Canister top and bottom vacuum sealing plates 40, 42 are most preferably of generally planar configuration, as illustrated, and preferably have vacuum sealing gaskets 58, 60 positioned to run circumferentially around unnumbered preferably circular lips of canister top and bottom vacuum sealing plates 40, 42 respectively.

When a canister 12 is at vacuum drying position 102, pneumatic actuation of respective canister top and bottom sealing piston-cylinder combinations 44, 46 respectively causes respective canister top and bottom vacuum sealing plates 40, 42 to move vertically and axially towards canister 12. This effectuates an airtight, vacuum-maintaining seal between the preferably circular peripheries of top and bottom sealing plates 40, 42, where vacuum gaskets 58 and 60 are preferably located, and the preferably circular circumferential top and bottom edges of tube 52.

Once moisture has evaporated from resin material due to draw of vacuum thereover within canister 12 while located at vacuum drying position 102 and the resin material has reached a desired degree of dryness, canister top and bottom sealing piston-cylinder combinations 44, 46 are permitted to return to their default positions illustrated in FIG. 4. This retracts canister top and bottom vacuum sealing plates 40, 42 away from and out of contact with canister 12, permitting canister 12, having the now-dried granular resin material therewithin, to be moved to the material inventory position.

Referring to FIGS. 5 and 6, canister bottom sealing plate 42 at vacuum drying position 102 includes a purging hot air aperture 50 appearing in both FIGS. 5 and 6. Aperture 50 provides an outlet into a canister 12 located at the vacuum drying position for a purge line 62 leading from the hot air supply represented by conduit 158 illustrated in FIG. 6. A purge valve 64 is provided within purge line 62 to open and close that line thereby to permit and block flow of hot air into a canister 12 at the vacuum drying position 102. Purge line 62 and purge valve 64 permit purging of moisture from granular resin material undergoing vacuum drying by periodically introducing hot dry air into that granular resin material and letting that hot dry air be drawn through the material by the vacuum being drawn out at the top of the canister. The effect of this is to give better efficiency, namely higher resulting dryness of the granular resin material when it finishes drying at the vacuum drying position 102. Purging typically lasts for thirty (30) seconds or one minute or even one minute and thirty seconds out of the total drying cycle time of twenty (20) minutes. Purging is desirably done at the end of the drying cycle and may also be done in the middle of the cycle as well.

The time during which vacuum is drawn within a canister 12 while located at vacuum drying position 102 may be adjusted, according to the type of material being dried, using the microprocessor. Similarly, the level of vacuum drawn in canister 12 at vacuum drying position 102 may be adjusted. Air withdrawn from canister 12 by action of vacuum venturi 48 communicating with top sealing plate 40 may be monitored for moisture content and vacuum venturi 48 may be halted once the desired low level of moisture of the material within canister 12 has been attained. The microprocessor controls operation of the low pressure dryer, including the sequencing and actuation of the various pneumatic piston-cylinder combinations, the operation of the venturi, etc.

Figure 10:
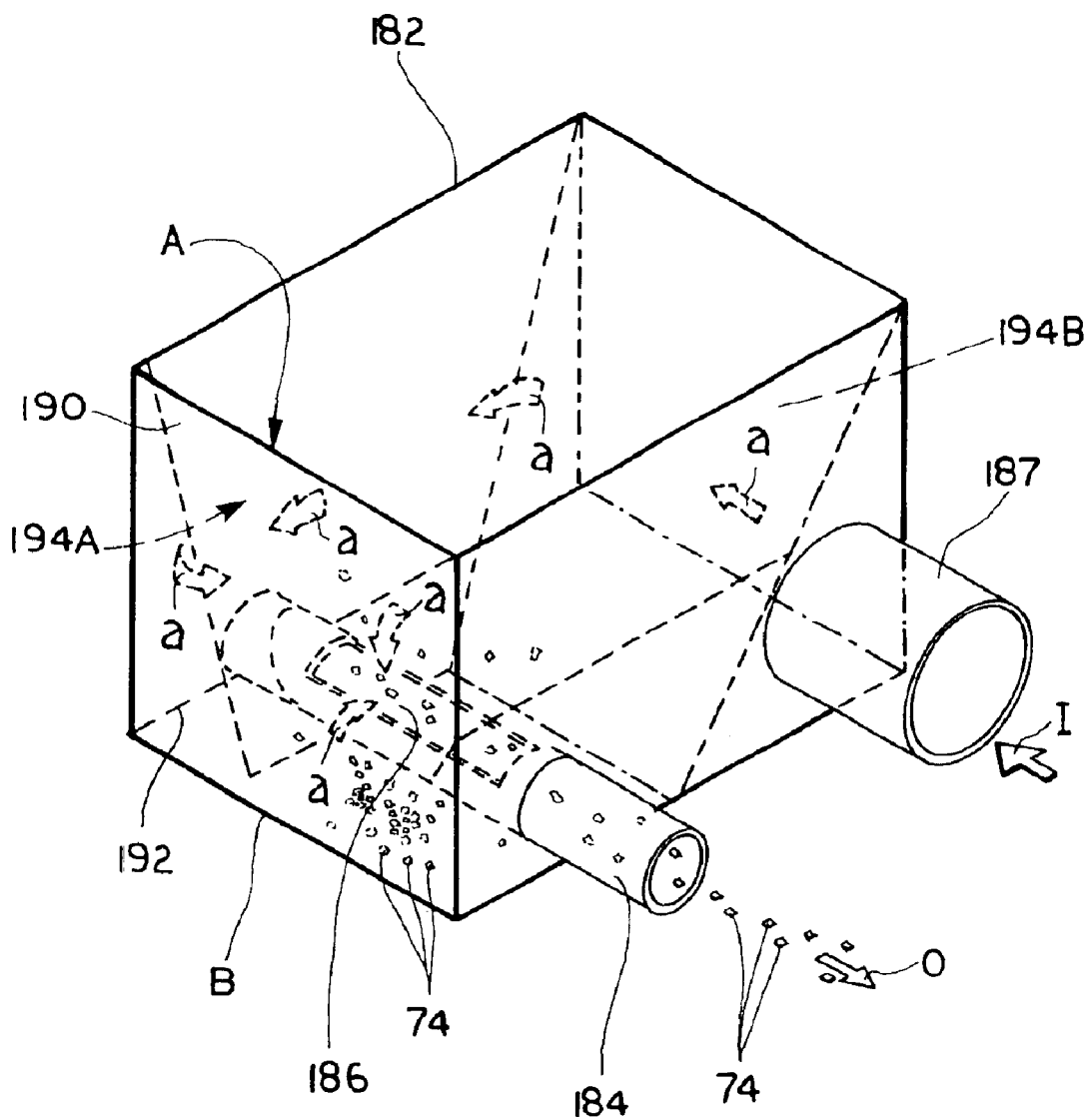
FIG. 10 is a schematic isometric drawing of the vacuum material takeoff box illustrated in FIGS. 8 and 9 depicting air and material flows.

The vertically-oriented cylindrical sets of canisters are carried indirectly by shaft 24 for rotation therewith by riding on carousel 21 as best illustrated in FIG. 10. Carousel 21 is preferably fixedly secured to shaft 24. Each cylindrical canister 12 is manually removable from carousel 21.

Arrow B in FIGS. 11 and 12 depicts the preferred direction of rotation of vertical shaft 24, carousel 21 and canisters 12 so as to move one of canisters 12 serially from the heat position 100 to vacuum drying position 102, then to inventory position 104 and then again to heat position 100, where this cycle may repeat.

At vacuum drying position 102, heated material is preferably subjected to a vacuum of about 27.5 millimeters of mercury or greater. This lowers the evaporation point or boiling point of water to about 120° F., thereby causing the moisture within the heated material to evaporate and be drawn off by the vacuum venturi 48 drawing vacuum within canister 12 at vacuum drying position 102; vacuum venturi 48 connects via suitable flexible hose to an aperture in canister top sealing plate 40 to draw vacuum within canister 12 at vacuum drying position 102. Once the vacuum drying process is sufficiently complete, piston-cylinder combinations 44, 46 retract canister top and bottom sealing plates 40, 42 so that canister 12 may move from vacuum drying position 102 to material dispense position 104 as carousel 21 rotates. A vacuum pump may be substituted for vacuum venturi 48.

Blower 76 is preferably a one horsepower blower. Preferably two heater elements 82 are utilized, as illustrated in the drawings.

The material heating and vacuum drying functions may each take approximately twenty minutes. Accordingly, in one hour, all three canisters 12 preferably cycle through material fill and heat position 100, vacuum drying position 102 and material inventory and dispense position 104. If each canister 12 is approximately 10 inches in diameter and 24 inches high, each canister 12 will hold about one cubic foot of granular resin material, which is about thirty-five pounds of granular resin material. With such configuration, dryer 10 provides about 100 pounds per hour of dried granular resin material for subsequent processing by plastic injection molding or extrusion equipment. The size may be scaled up or down, as desired.

Canisters 12 are preferably provided equally spaced around vertical shaft 24 with canisters 12 being 120 degrees apart.

Referring to FIGS. 2, 6, 8, 9 and 10, vacuum material takeoff box 182 is provided at the bottom of material inventory position 104 for removal and conveyance of dried granular material from dryer 10 to a process machine such as a compression or injection molding press or an extruder. The vacuum material takeoff box is designated generally 182 in the drawings and has a material takeoff tube 184 rotatably resident therewithin.

As illustrated in FIG. 9, vacuum material takeoff box 182 is preferably mounted on one end of a pivoting beam 196 where beam 196 is pivotally connected to frame 22, preferably to one of intermediate cross members 155 running between the two vertically extending members 160LP and 160RR at the rear of dryer 10. The point of pivotal connection is denoted P in FIG. 9. Pivoting beam 196 is preferably actuated by a vertically oriented piston-cylinder combination 198 which is preferably mounted on a lower horizontal framing cross member 165. Piston-cylinder combination 198 is visible in FIGS. 2, 3, 4 and 9.

Figure 8:
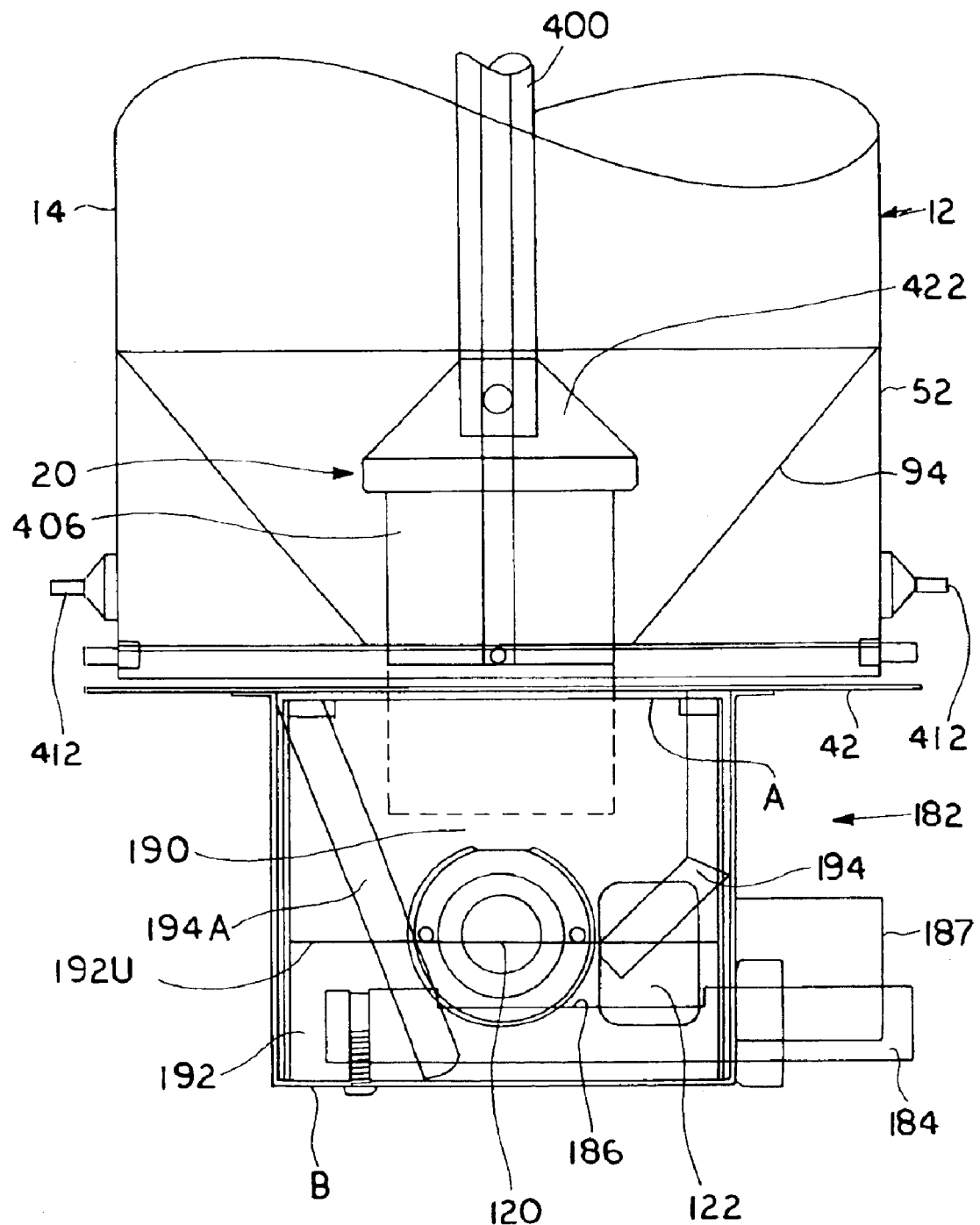
FIG. 8 is a broken enlarged front view of a portion of the dryer illustrated in FIG. 2 showing a vacuum material takeoff box and a lower portion of a canister at a material inventory and discharge position in detail.

Referring to FIGS. 8, 9 and 10, material takeoff box 182 includes manually rotatable material takeoff tube 184 and an air inlet 187 providing the inlet for a vacuum or suction based material delivery system via which granular material within material takeoff box 182 is carried by subatmospheric pressure air from the interior of rotatable material takeoff tube 184 outwardly, as indicated by arrow O in FIG. 10. Air supplied to inlet 187 is denoted by arrow I in FIG. 10. The rotatable characteristic of tube 184 allows adjustment of material flow rate therethrough by adjustment of the angular position of tube 184.

A material fill aperture 186 is present in rotatable material takeoff tube 184. Aperture 186 is preferably axially elongated and formed as a cutout in the wall of tube 184, with the cutout preferably being defined by two preferably substantially straight edges which are parallel with the axis of tube 184 and two preferably substantially parallel arcuate edges formed along lines of circumference of tube 184, as illustrated in FIG. 10. Desirably, the two substantially parallel arcuate edges forming two of the boundaries of material fill aperture 186 subtend angles of less than 180 degrees.

Vacuum material takeoff box 182 preferably includes a first pivoting upper front plate 190 which is preferably fabricated from clear plastic or safety glass material and pivots about a hinge running substantially coaxially with an edge denoted "A" of material takeoff box 182 in FIGS. 8 and 10.

Preferably forming a part of the same essentially planar surface of material takeoff box 102 is a second pivoting lower front plate 192 which is preferably similarly formed of clear plastic or safety glass material in the same manner as first pivoting upper front plate 190, but which pivots about an edge parallel with the edge denoted A in FIGS. 8 and 10, with such edge being denoted B in FIGS. 8 and 10. An upper edge of lower front plate 192 preferably overlaps a lower edge of upper front plate 190 when the plates are in their essentially co-planar disposition, providing a closed front for takeoff box 182 as illustrated in FIG. 8. The upper edge of lower front plate 192 is denoted 192U in FIG. 8. Pivoting action of plates 190, 192 to open the front of box 182 facilitates cleanout thereof.

Material takeoff box 182 is preferably of rectangular parallelepiped exterior shape so that oppositely facing exterior surfaces of material takeoff box 182 are essentially parallel one to another.

A collection of generally angularly disposed preferably at least partially planar baffles are preferably provided within material takeoff box 182; the baffles are denoted generally 194, 194A, etc. Baffles 194 serve to deflect and diffuse the vector of incoming air at air inlet 187 thereby to render more efficient the vacuum pickup of pellets of granular resin material for conveyance thereof by the slightly subatmospheric pressure air drawn out of the interior of rotatable material takeoff tube 184. Motion of the diffuse air within material takeoff box 182 is generally denoted by arrows labeled "a" in FIG. 10.

Referring to FIG. 8, material takeoff box 182 preferably further includes a material sensor 120 as well as a sight glass 122 through which the interior of material takeoff box 182 and the presence of or absence of granular resin material therein can be visually checked. Material sensor 120 serves to actuate an alarm whenever there is an absence of material in material takeoff box 182 ready for conveyance to the process machine upon demand.

Figure 15:
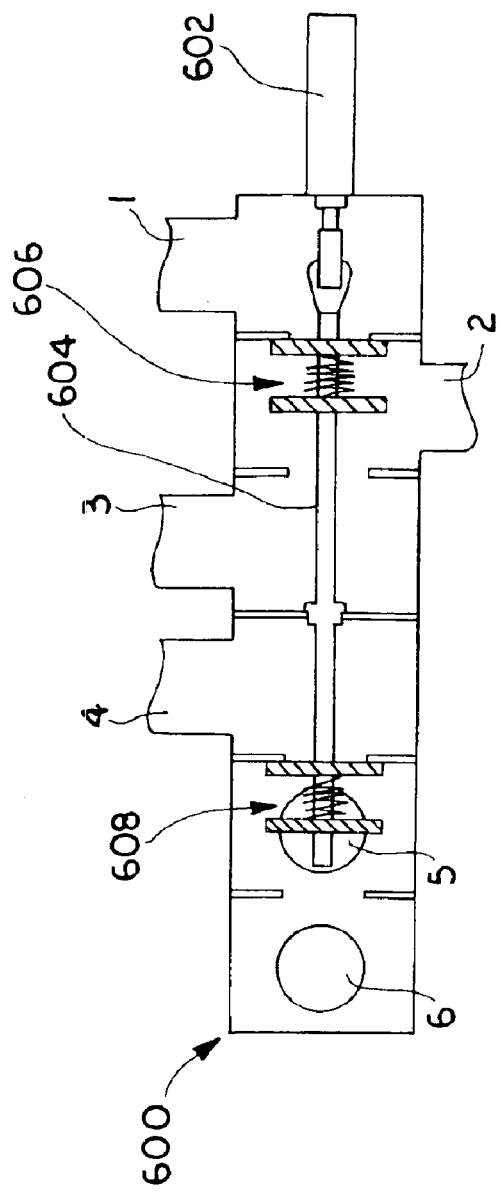
FIGS. 15 and 16 are schematic views of a duplex valve box, showing the valves in two different positions, for use in directing air flows in connection with the dryer of the invention as illustrated in FIGS. 2 through 4 and 6.
Figure 16:
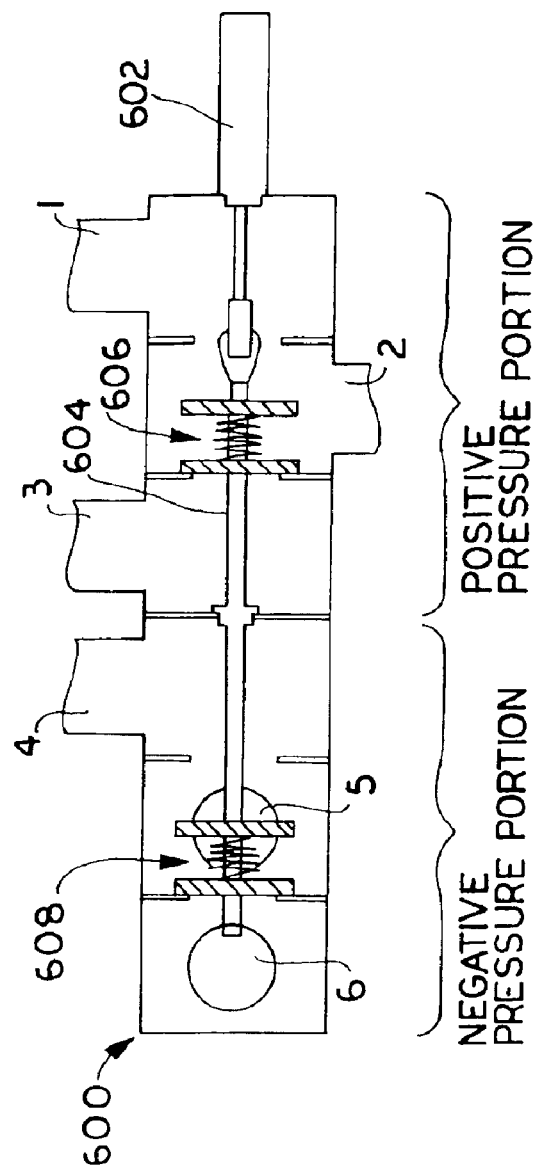

Referring to FIGS. 6, 15 and 16, a duplex pneumatic valve box is designated generally 600 and is used to control air flows in the dryer of the invention. Duplex pneumatic valve box 600 includes a pneumatic piston-cylinder combination 602 which moves a shaft 604 between the positions illustrated in FIGS. 15 and 16. Mounted on shaft 604 are first and second valve members 606, 608, each of which preferably includes two valve disks resiliently coupled by a coil spring. The valve disks and coil spring are not numbered in FIGS. 15 and 16 to aid drawing clarity.

Duplex pneumatic valve box 600 has a positive pressure portion and a negative pressure portion as indicated by the brackets in FIG. 16. An inlet to the positive pressure portion is denoted 2 in FIGS. 15 and 16 and is the position at which hot air is supplied to duplex pneumatic valve box 600 by blower 76 via conduit 156 as illustrated in FIG. 6.

Duplex pneumatic valve box 600 has two outlets from the positive pressure portion. The outlet numbered 1 in FIGS. 15 and 16 connects to conduit 158, illustrated in FIG. 6, which conveys hot air from the positive pressure portion of duplex pneumatic valve box 600 to a canister 12 located at material fill and heating position 100, as illustrated in FIG. 6, when duplex pneumatic valve box is in the configuration illustrated in FIG. 16.

When duplex pneumatic valve box 600 is in the alternate configuration due to piston-cylinder combination 602 being in the alternate disposition, hot air exiting from the positive pressure portion of valve box 600 exits via outlet 3. Connected to outlet 3 and leading from duplex valve box 600 to air inlet 187 is air inlet line 188 illustrated in FIG. 6.

Aperture 4 providing an inlet to the negative pressure portion of duplex pneumatic valve box 600 receives hot air exiting from a canister 12 at fill and heat position 100 via conduit 146 illustrated in FIG. 6. Aperture 6 provides an inlet to the negative pressure portion of duplex pneumatic valve box 600 for return line 140 via which air is returned from a fill cylinder 142 serving as a holding receptacle for granular resin material to be used by the molding press or extruder.

Aperture 5 in the negative pressure portion of the duplex pneumatic valve box 600 communicates with conduit 136 leading to air filter 82, which in turn is connected to inlet aperture 78 of blower 76.

Also shown in FIG. 6 is a conduit 138 connecting rotatable material takeoff tube 184 to fill cylinder 142 and hence conveying dried granular resin material from vacuum material takeoff box 182 to cylinder 142.

When valve box 600 is in the configuration illustrated in FIG. 16, flow in the negative pressure portion is of exhaust hot air coming from conduit 146 into box 600 via aperture 4 and being drawn to air filter 82 and blower 76 via conduit 136 as such air exits box 600 via aperture 5.

When box 600 is in the configuration illustrated in FIG. 15, hot air entering the positive pressure portion of box 600 via aperture 2 is supplied as positive pressure air to vacuum material takeoff box 182 via conduit 188 connected to aperture 3. In this same configuration air is drawn through the negative pressure portion of box 600 from material storage cylinder 142 via conduit 140 after delivering dried granular resin material to cylinder 142 via conduit 138. Hence FIG. 15 depicts duplex pneumatic valve box in the material delivery configuration while FIG. 16 depicts duplex pneumatic valve box in the material heating configuration.

Duplex pneumatic valve box 600 effectuates an important feature, namely the ability to provide hot conveying air as the means used to move the dried granular resin material, once that material has been dried, to the operating position, namely to fill cylinder 142 for molding or extrusion. This is advantageous over the use of ambient air from the room in which dryer 10 is located to move granular resin material from dryer 10 to where the material is needed. Valve box 600 allows hot air from blower 76 to be supplied to vacuum material takeoff box 182 to move granular resin material from vacuum material takeoff box 182 to fill cylinder 142. This use of hot air helps the granular resin material to stay warmer longer; it is desirable to process the granular resin material by molding or extrusion while the granular resin material is warm. If the granular resin material is allowed the opportunity to cool, the granular resin material picks up moisture which adversely affects performance of the granular resin material when molded or extruded. Use of hot air to convey the granular resin material after it has been dried keeps the granular resin material warm longer, giving more lead time for molding or extrusion.

Figure 14:
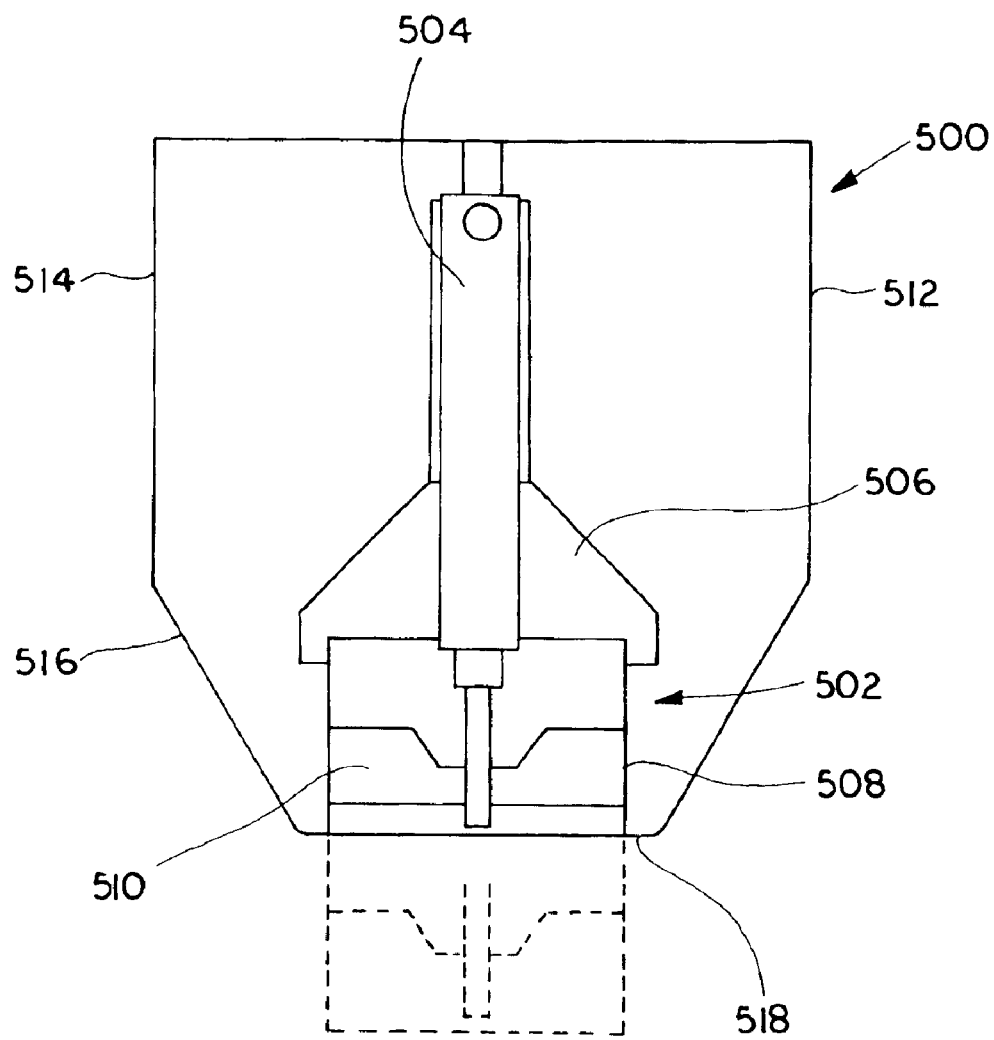
FIG. 14 is a sectioned elevation of a material supply and fill hopper optionally provided for use with the dryer in accordance with the invention.

FIG. 14 illustrates an optional but preferable material supply hopper for use with dryer 10. The material supply hopper 500 includes a container 512 which is preferably aluminum. Container 512 preferably has an upper cylindrical portion and a lower frusto-conical portion where these two portions are denoted 514, 516 respectively.

Material supply hopper includes a material supply valve designated generally 502 in FIG. 14; valve 502 is highly similar to canister dispense valve 20 described above and illustrated in FIGS. 7 and 13. Material supply valve 502 is actuated by a piston-cylinder combination 504 which is fixedly mounted within material supply hopper 500 by a mounting pin numbered 520. Material supply valve 502 includes a material supply valve umbrella 506 which overlies an axially displaceable material supply valve cylinder 508 having an open center for axially directed flow of material therethrough, downwardly out of material supply hopper 500 when material supply valve 502 is at the open position. A supply valve shaft-cylinder connecting flange 510 is positioned within and runs preferably diametrically across the interior of axially displaceable material supply valve cylinder 508, providing means for attachment of cylinder 508 to a rod 522 extending from piston-cylinder combination 504.

When axially displaceable material supply valve cylinder 508 is in the upper position illustrated in solid lines in FIG. 14, the open upper end of axially displaceable material supply valve cylinder 508 is covered by material supply valve umbrella 506 and the curved wall of cylinder 508 extends axially past the aperture in the bottom 518 of container 512. As a result, at this position no granular material within supply hopper 500 can flow downwardly through the interior of axially displaceable material supply valve cylinder 508.

Container 512 has a bottom 518 in which is formed an aperture for sliding receipt of axially displaceable material supply valve cylinder 508. The sliding fit between bottom 518 and the curved wall of cylinder 508 is sufficiently close that granular material cannot pass therebetween.

When desired to open valve 502, piston-cylinder 504 is actuated, extending piston rod 522 and thereby moving axially displaceable material supply valve cylinder 508 downwardly into the position illustrated in dotted lines in FIG. 14 whereupon granular material within material supply hopper 500 may flow downwardly through the open center of axially displaceable material supply valve cylinder 508. To close material supply valve 502, piston-cylinder combination 504 is de-energized whereby an internal spring draws piston rod 522 upwardly in FIG. 14 thereby moving axially displaceable material supply valve cylinder 508 upwardly into contact with material supply valve umbrella 506. This closes the upper end of supply valve cylinder 508 to material flow and no material then can flow downwardly out of material supply hopper 500.

The dryer in the preferred embodiment of the instant invention, with the preferred vertical orientation of the movable canisters, requires less floor space than a conventional desiccant dryer having the same capacity. Additionally, there is no desiccant maintenance as there is in a conventional desiccant dryer thereby eliminating lost production time which is required with a conventional desiccant dryer. Moreover, as desiccant material deteriorates, the quality of the plastic granular material being dried suffers. However, with the dryer of the invention in any of its embodiments, since there is no desiccant material involved there is no risk of deterioration of product quality from the desiccant material. Performance of the dryer according to the invention remains constant and does not deteriorate over time.

The dryer according to the invention shortens drying time relative to a desiccant dryer thereby avoiding prolonged exposure of the granular resin material to heat. This helps to maintain desired physical properties of the resin material.

The dryer according to the invention reduces labor costs in that clean-out time for hoppers for a color or material change is minimal. Typically, a dryer according to the invention should require less than 10 minutes of total time to clean whereas a conventional desiccant dryer can take up to one hour for cleaning.

Some materials cannot be effectively dried two times. In the event it becomes necessary to stop the dryer of the invention, the canisters may be sealed thereby eliminating the need to dry the material in the canister a second time. This is not the case with typical desiccant dryers.

Desiccant dryers typically require material feed hoppers to be at least half full for proper air flow. Hence if material usage is low for a particular molding operation, extended exposure to heat in a conventional desiccant dryer may degrade the plastic resin molding material. There is no such requirement for a full canister for the dryer in accordance with the invention to operate properly.

Test data reveals that operating costs of the dryer according to the invention are less than one-half that of a desiccant dryer having the same capacity. In many cases operating cost is reduced by as much as 80% over that of a desiccant dryer having the same capacity. Additionally, start-up time using a dryer in accordance with the invention is under one hour whereas typical desiccant dryers require four hours or more for start-up.

Use of the dryer in accordance with the invention permits material changeover time to be reduced to zero if the operator plans about one hour ahead. Color changes in material can be made "on the fly" with no lost time simply by changing the material in a given canister. When the dryer in accordance with the invention operates on a 20-minute cycle, unused inventory of blended material represents at most 40 minutes of dryer time, not four hours as is the case with a conventional desiccant dryer.

The dryer in accordance with the invention minimizes the need to expose material to be dried to high heat for extended periods, dramatically eliminating or minimizing the loss of physical properties which some materials experience when exposed to high heat for extended periods.

The dryer in accordance with the invention permits drying of plastics at lower temperatures than known heretofore; PET heretofore has had to be dried at about 350° F. (180° C.) but with the dryer in accordance with the invention PET can be dried at 245° F. (120° C.)

No cooling water is required for the dryer in accordance with the invention.

The lower temperature at which the dryer in accordance with the invention operates allows addition of color concentrates to resin materials prior to drying rather than afterwards.

Another problem addressed by the dryer in accordance with the invention is the separation of preblended materials during extended residence times in large hoppers. The canisters of the dryer in accordance with the invention are typically lower in volume than conventional desiccant dryers and fill and empty in distinct and complete batches thereby eliminating the problem of material separation.

The dryer of the invention does not require and does not utilize a dew point meter or a dew point control, both of which are subject to reliability problems but are necessary with desiccant dryers.

A dryer in accordance with the invention preferably operates using an air supply from 75 to 80 psi. This air, which is typically from the air supply in the facility in which the dryer is used, serves to generate the required vacuum as well as operate all of the air cylinders of the low pressure dryer. To conserve usage of facility air, the venturi vacuum generator of the dryer of the invention is desirably cycled on and off during operation to maintain a minimum vacuum of 25 inches. For large installations, a vacuum pump may be substituted for the venturi vacuum generator.

The microprocessor controller of the dryer preferably includes thumbwheel switches or functionally equivalent structure which are used to set temperature to which the resin or other granular material is to be heated prior to drying. Another thumbwheel switch or functionally equivalent structure is preferably used to set the minimum acceptable time as the time for a heating cycle and a drying cycle. Typically 20 minutes is the cycle time for acrylic, ABS and polycarbonate while 40 minutes is the cycle time for PET. A third thumbwheel switch or functionally equivalent structure is preferably used to set fill time, which controls the time for filling a canister at the fill and heat position.

During operation, the three identical material canisters 12 or functionally equivalent structure rotate through the three stations, namely the fill and heat position 100, the vacuum dry position 102 and the inventory and dispense position 104. Once there is material in a supply hopper or functionally equivalent structure above fill and heat position 100, an operator presses a button on the microprocessor controller or functionally equivalent unit to begin the operating sequence. Canisters 12 then index to a starting position based on the position when the dryer was locked and last shutdown and the carousel locking arm 124 or functionally equivalent structure moves into position to engage a vertex portion 125 of locking cam 126 or functionally equivalent structure. When locking arm 124 or functionally equivalent structure is at vertex portion 125, microswitch 128 or functionally equivalent structure is actuated by eccentric lobe 130 or functionally equivalent structure and signals the microprocessor that the locking operation has occurred. Further operation of dryer 10 is conditioned on the microprocessor verifying occurrence of such locking engagement of locking arm 124 or functionally equivalent structure into vertex position 125 of locking cam 126.

After locking has been confirmed, the microprocessor actuates piston-cylinder combination 106 or functionally equivalent structure, raising heating position bottom sealing plate 86 or functionally equivalent structure into position against the bottom of a canister 12 located at heat and fill position 100. Next, the microprocessor checks sensor 153 in heating position bottom sealing plate 86 to verify presence of a canister 12 at heat and fill position 100.

Upon the microprocessor verifying presence of a canister 12 at heat and fill position 100, the microprocessor actuates piston-cylinder combination 110 to open material intake valve 108, both of which are illustrated in FIG. 11 whereupon granular material to be dried may flow downwardly into a canister 12 located at fill and heat position 100. Desirably, a fill hopper or functionally equivalent structure fitting atop dryer 10 and supported by a rectangular framework 118 or functionally equivalent structure holds granular resin or powdery material to be dried and is of a volume slightly less than that of a canister 12. Hence, the entire capacity of such a filling hopper resting atop rectangular framework 118 can be filled into a canister 12 without fear of overflow.

The microprocessor proceeds to actuate piston-cylinder combinations 44, 46 thereby moving canister top and bottom sealing plates 40, 42 at vacuum position 102 into position against the top and bottom of a canister 12 located at vacuum drying position 102.

The microprocessor then proceeds to actuate piston-cylinder combination 170 or functionally equivalent structure which is over inventory position 104. Actuation of piston-cylinder combination 170 closes a canister lid 172 against the top of a canister 12 located at inventory position 104 and axially displaces a valve stem shaft 400 or functionally equivalent structure in that canister 12 located at material inventory position 104. At the same time, the microprocessor actuates piston-cylinder combination 198 thereby raising pivoting beam 196 and lifting vacuum material takeoff box 182 into position.

The microprocessor next turns on the venturi vacuum generator 48, or the vacuum pump if used in place of the venturi generator, and if adequate vacuum is not attained within 90 seconds, the microprocessor activates an alarm. Assuming the alarm was not actuated, the microprocessor actuates blower 76 and turns on heater 82 shortly thereafter. The microprocessor checks for increasing temperature and if a temperature increase in the air supplied by blower 76 to a canister 12 at material fill and heat position 100 is not detected within 60 seconds, the microprocessor turns off heater 82, stops operation of the dryer and sounds an alarm.

When the microprocessor opens valve 108, the canister 12 located at fill and heat position 100 begins to fill with material to be dried. Hot air enters the bottom of canister 12 to heat the granular material as canister 12 fills with material. Typically the heating process continues for twenty (20) minutes, assuming this is the time that has been set by the operator and input to the microprocessor. Blower 76 and heater 82 are sized complementally to heat a single canister 12 of material in twenty (20) minutes. Sometimes material near the top of canister 12 may not reach the full heating temperature in twenty (20) minutes but this may be acceptable as full heating may not generally be required for full drying. After twenty (20) minutes, the heating cycle ends, carousel locking arm 124 is retracted from a vertex position 173 of lockable cam 174 by actuating piston-cylinder combination 176 thereby freeing carousel 21 for rotary motion, and an appropriate one of first, second and third driving rotation piston-cylinder combinations 34, 36, 38 is actuated thereby to index canisters 12 carried by carousel 21 to the next position.

The one of canisters 12 carrying the material which has been heated at position 100 moves to vacuum drying position 102. At this position twenty (20) minutes of applied vacuum is sufficient to dry the full charge of heated material in canister 12. Typically, vacuum levels of twenty-five (25) inches of mercury are adequate for drying; in extreme cases, vacuum of twenty-nine (29) inches may be used for the drying. The vacuum drying is desirably interrupted periodically and/or terminated by forcing hot air purging through canister 12 via purge line 62 while at the vacuum drying position 102, which clears moist air from canister 12 having the granular material therein being dried.

Desirably, the timer of the microprocessor only increments and counts time when heated air temperature is within twenty degrees (20°) of the target temperature and the vacuum is at least twenty-five (25) inches of mercury. As a result, the first minute or so of each drying and heating cycle does not count towards the cycle time.

After twenty (20) minutes of drying, canisters 12 are preferably moved again so that the one of canister 12 having now dry material therewithin is moved to the inventory and dispense position 104. As a result, there is a supply of adequately dry granular resin material for use by a process molding press or extruding machine.

From that point, canister indexing preferably occurs only when a level sensor at the inventory position indicates that the canister 12 at that location is empty.

Figure 20:
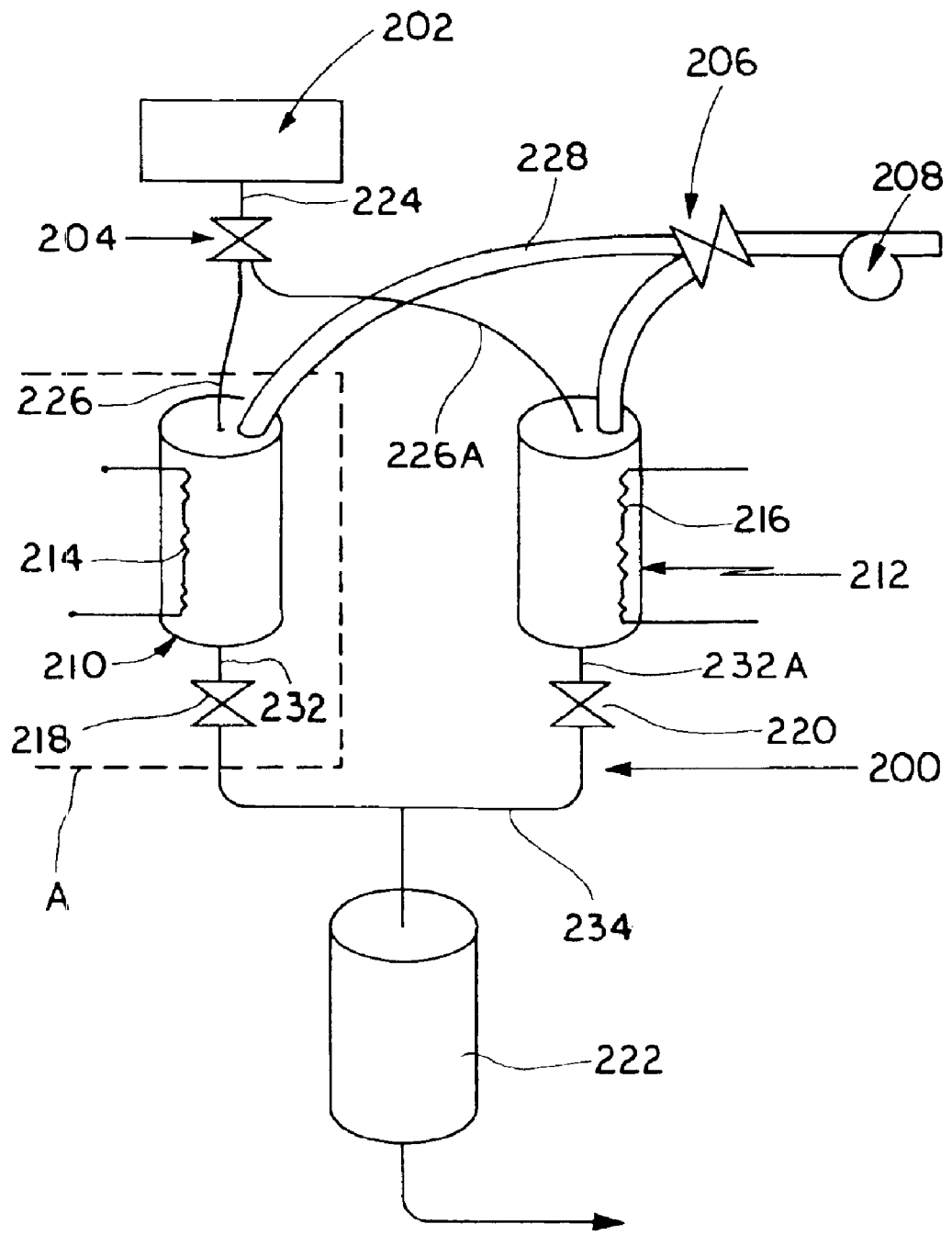
FIG. 20 is a schematic view of a dryer in accordance with a second embodiment of the invention.

FIG. 20 schematically depicts a second embodiment of a vacuum dryer embodying aspects of the invention where the vacuum dryer is designated generally 200. A material supply container 202 or equivalent structure is provided as indicated schematically at the top of FIG. 20; material supply container 202 need not be a part of vacuum dryer 200.

A preferably tubular material feed line 224 or equivalent structure leads out of material supply 202, preferably downwardly, and connects to a material flow control valve or equivalent structure depicted schematically as 204 in FIG. 20.

Material flow control valve 204 provides material to either of two material feed lines 226, 226A or equivalent structure which lead to respective ones of first and second material processing chambers 210, 212 or equivalent structure, both of which are illustrated as vertically oriented cylindrical processing chambers in FIG. 20. Other geometric configurations and shapes may also be used.

First and second material processing chambers 210, 212 are equipped with means for heating granular material, such as plastic resin, delivered thereinto via material feed lines 226, 226A. The heating means may be one or more electrical resistance heaters as illustrated schematically and designated 214, 216 in first and second material processing chambers 210, 212. Alternately and preferably hot air is blown through first and second material processing chambers 210, 212 to effectuate heating of material contained therewithin, in the same manner illustrated and disclosed above generally with respect to the preferred embodiment.

Vacuum dryer 200 further includes a vacuum pump or equivalent structure designated generally 208. Vacuum pump 208 draws vacuum within a selected one of first and second material processing chambers 210, 212 according to the position of vacuum control valve 206 or equivalent structure, which is connected to draw vacuum created by vacuum pump 208 from a selected one of first and second material processing chambers 210, 212. Vacuum lines 228, 228A or equivalent structure connect first and second material processing chambers 210, 212 to vacuum pump 208. A further vacuum line 230 or equivalent structure connects control valve 206 to vacuum pump 208.

Preferably leading from the bottoms of first and second material processing chambers 210, 212 are a pair of outlet lines 232, 232A or equivalent structure, which in turn connect to first and second dried material flow control valves 218, 220 respectively. First and second dried material flow control valves 218, 220 or equivalent structure control downward flow of dried granular or powdery resin material from respective processing chambers 210, 212 into a reservoir 222 in which the dried granular material is retained until needed by the manufacturing process. Line 234 carries material released by valve 218 or 220 into reservoir 222. Material feed line 236 carries dried material as needed from reservoir 222 to a process machine for fabrication where the process machine is desirably either a molding press or an extruder.

During operation of vacuum dryer 200, moist granular material requiring drying is initially fed via valve 204 under the influence of gravity into the first material processing chamber 210. While in processing chamber 210, the granular resin material is heated, preferably by flow of hot air therethrough, until the material reaches a temperature at which vacuum is highly effective to evaporate moisture out of the material.

Once application of heat ceases, first material processing chamber is then preferably sealed so vacuum can be drawn therein and vacuum pump 208 or equivalent structure actuated, with valve 206 or equivalent structure connecting vacuum pump 208 to first material processing chamber 210. Vacuum is preferably drawn for sufficient time to evaporate the required amount of moisture out of the granular resin material within first material processing chamber 210.

While vacuum is being drawn over and moisture is being evaporated from the material in processing chamber 210, second material processing chamber 212 has preferably been filled with material and the granular resin material within chamber 212 is heated to the required temperature for evaporation of moisture therefrom.

Once the evaporation operation has been completed with respect to the material in chamber 210 and the heating has been completed with respect to the material in chamber 212 by virtue of that material having reached the required temperature for evaporation of moisture therefrom, the position of valve 206 may be switched so that vacuum pump 208 draws a vacuum within chamber 212 through conduits 228A and 230. During this time, dried material within chamber 210 may be evacuated via lines 232 and 234 by opening valve 218 so that material may flow downwardly into reservoir 222 and be stored therein until needed for processing by the process machine, to which that material may then be carried by line 236. Once first material processing chamber 210 is empty, chamber 210 may be refilled using material from supply 202 by appropriate positioning of valve 204, whereupon material may flow from supply 202 via conduits 224, 226 into chamber 210 and the process repeated.

Because evaporation of moisture under vacuum is temperature sensitive and increases greatly in rate with increasing temperature, little is gained by seeking to apply vacuum to the moist granular material before the material has been raised to the appropriate temperature. As a result, a "dual" vacuum dryer system, namely one having two material processing chambers in which one batch of material can be heated while a second batch of material (having already been heated to the desired temperature) is having vacuum drawn thereover and moisture evaporated therefrom, is probably a more efficient system in terms of the amount of dried material delivered per unit time than a system in which vacuum is drawn over the material as the material is being heated.

Vacuum dryer 200 illustrated in FIG. 20 is depicted schematically. First and second material processing chambers 210, 212 are desirably equipped with heated air inlet and outlet hoses and with vacuum inlet and outlet hoses and vacuum sealing means of the type disclosed above with respect to the preferred embodiment of the invention.

Valve 204 functions as a manifold, preferably being connected to the first and second processing chambers 210, 212, and preferably selectably furnishes material to be dried to one of the two first and second processing chambers. Desirably, valve 204 acts as a manifold to furnish material to a selected one of first and second chambers 210, 212 most recently having dried material evacuated therefrom. Furthermore, it is desirable that first and second processing chambers 210, 212 have separate means for heating material in each of or associated with those two chambers.

The apparatus illustrated in FIG. 20 may be modified to utilize only a single material processing chamber, either 210 or 212. While this arrangement may be less expensive, it is also less efficient in that granular material to be dried cannot be effectively dried under vacuum until heating has been completed, as noted above.

Figure 21:
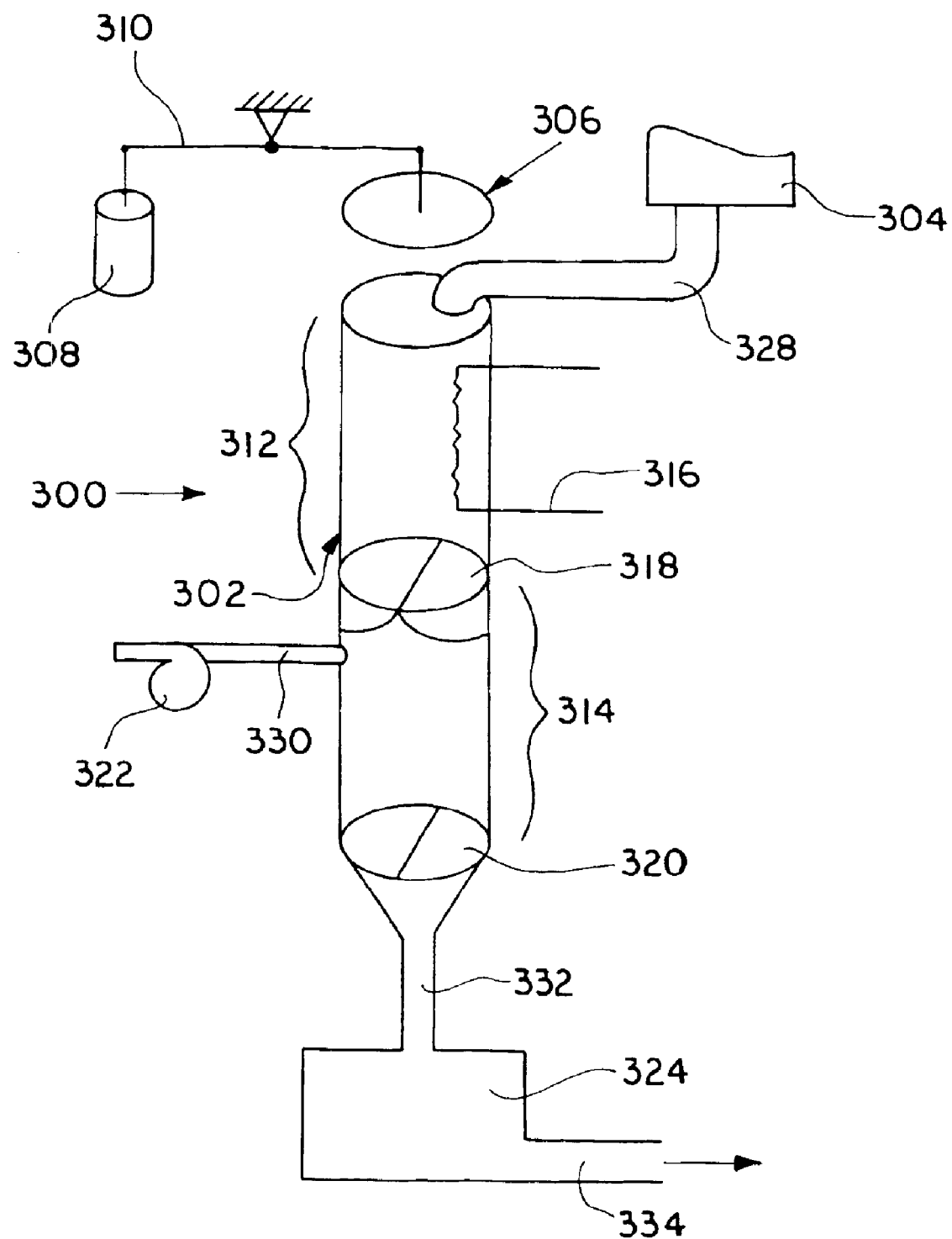
FIG. 21 is a schematic view of a dryer in accordance with a third embodiment of the invention.

A third embodiment of a vacuum dryer manifesting aspects of the invention is illustrated schematically in FIG. 21 with the vacuum dryer being designated generally 300 and including a material processing chamber designated generally 302.

A material supply container or equivalent structure is designated generally 304 and serves as a storage receptacle for granular or powdery material requiring drying; material supply container 304 need not be a part of dryer 300.

Material processing chamber 302 or equivalent structure is preferably equipped with a preferably sealing lid designated generally 306 and positioned to close an inlet end 326 of processing chamber 302 or equivalent structure. Sealing lid 306 is preferably moved by a preferably pneumatic actuating cylinder 308 connected to sealing lid 306 by a suitable pivoting arm 310. Upon actuation of cylinder 308, sealing lid 306 moves into position to seal inlet end 326 of processing chamber 302.

Granular resin or powdery material requiring drying is conveyed, preferably by gravity, from material supply 304 or equivalent structure to inlet end 326 of processing chamber 302 or equivalent structure via material conveying tube 328.

Material processing chamber 302 is preferably divided into two zones, a heating zone or equivalent structure designated generally 312 and a vacuum drying zone or equivalent structure designated generally 314. Zones 312, 314 are preferably separated by a sealing trap door or equivalent structure which is designated 318 and referred to as a first sealing trap door within preferably cylindrical material processing chamber 302. Heating zone 312 is preferably adapted to heat granular or powdery material contained therewithin. An electrical resistance heater has been designated 316 and is shown schematically as a part of heating zone 312 to indicate the heating function; heating may also be and is preferably provided by hot air in the manner described generally above respecting the preferred embodiment of the vacuum dryer.

A vacuum pump 322 or equivalent structure is preferably connected to vacuum drying zone 314 of processing chamber 302.

The lower or exit end of vacuum drying zone 314 is preferably bounded by and defined by a second sealing trap door or equivalent structure designated generally 320 in the drawings. Second sealing trap door 320 preferably leads to a dried material discharge conduit 332 providing dried granular or powdery material to a reservoir 324 from which material may be supplied to a molding machine or extruder as required, preferably via outlet conduit 334.

During operation of the embodiment of the dryer apparatus illustrated in FIG. 21, a first portion of granular or powdery material to be dried is preferably advanced from a supply in material supply container 304 preferably through material inlet conveying tube 328 into heating zone 312 of material processing chamber 302. Once within heating zone 312, that first portion of material is heated, preferably by forcing or drawing hot air through the material. Temperature of the material is preferably regulated substantially in the same manner as described above, namely by comparing temperature of the air going into the material and temperature of the air coming out of the material, and when those air temperatures are equal, the material is known to be substantially heated to the required temperature.

Once the first portion of heated material is known to be substantially at the required temperature, that first portion of material preferably is advanced from heating zone 312 preferably into vacuum drying zone 314, preferably by opening sealing trap door 318 or equivalent structure separating heating zone 312 from vacuum zone 314 and allowing the heated material to fall due to gravity from heating zone 312 into vacuum drying zone 314.

Once the first portion of heated material has been evacuated from heating zone 312 into vacuum drying zone 314, a second portion of heated material preferably may be advanced from supply 304 via tube 328 into heating zone 312, whereupon heating of that batch of material may commence.

For the first portion of material which is now in vacuum drying zone 314, a vacuum is preferably drawn over that first portion of material to dry the first portion of material while a second portion of material, which is now preferably in heating zone 312, is preferably heated.

Once drying of the first portion of material is substantially completed in vacuum drying zone 314, second sealing trap door 320 or equivalent structure preferably may be opened and the first portion of material, which is now dried to the required level, may preferably advance downwardly, preferably due to the force of gravity, through dried material discharge conduit 332 or equivalent structure, into reservoir 324 or equivalent structure in which the dried granular material is preferably stored until needed by the process machine.

These steps of advancing portions of granular material from the supply into the heating zone, heating of material in the heating zone while the next preceding portion of material is being dried in the vacuum drying zone and then advancing the two portions of material successively from the drying zone into the reservoir and from the heating zone into the drying zone may preferably be repeated until such time as no additional dried material is required by the process machine to which conduit 334 is connected or leads.

Conventional industry practice is to dry, then blend and then process granular resin material using a desiccant dryer, then a gravimetric blender and then a molding machine. The dryer of the invention facilitates reversal of that process, namely permitting drying to be done after measuring and blending. This is advantageous because of problems associated with desiccant dryers when used after the blending step, including separation of the blend resulting in a large quantity of resin material being already preblended that might not be usable in the event of such separation. This is the reason desiccant dryers are conventionally used prior to gravimetric blenders in the plastics molding industry. Since the invention facilitates drying of granular material after the measuring and blending of such material, the invention eliminates the risk involved in storing preblended material, namely separation of the blend which may render the material unusable.

With the dryer of the invention, removal of moisture is on the order of $^{2}\!/_{10}$ of 1% of the weight of the material so there is no adverse effect on the blend and the proportions of the blend that have been effectuated by a gravimetric blender positioned upstream of a dryer in accordance with the invention.

A dryer in accordance with the invention uniformly and consistently exhibits a six-fold reduction in drying time over that experienced using conventional desiccant dryers when drying granular plastic resin material prior to molding or extrusion. Such conventional desiccant dryers rely entirely on blowing warm air over the plastic material and having the warm dried air draw and absorb moisture out of the plastic material of interest.

In the dryer according to the invention, the vacuum drawn during the drying process is typically on the order of from one to three inches of mercury short of absolute vacuum. Hence, under standard conditions a dryer in accordance with the invention develops a vacuum of from 27 to 29 inches of mercury in the vacuum drying canister.

Preferably a dryer according to the invention supplies hot air to heat granular resin material at fill and heat position 100 at a temperature as high as 260° F. or even as high as 300° F.

In a typical application where a molding machine may require 100 pounds per hour of processed, dried, ready to mold plastic resin, a dryer in accordance with the invention can supply the same using a 35 pound capacity canister since such canisters cycle in 20 minutes at each of the three positions. Accordingly, during For a molding machine operating with a conventional desiccant dryer supplying the granular resin material at the same 100 pounds of material throughput per hour, a desiccant dryer having capacity of 400 pounds would be required in order to provide the 100 pounds per hour of material due to the four hour desiccant drying time. As a result, a dryer in accordance with the invention provides canisters 12, which are smaller, more manageable, take up less space and generally provide a more efficient operation for a molder than a conventional desiccant dryer.

A desiccant dryer process requiring 100 pounds throughput of material per hour requires a four hour lead time since such a desiccant dryer typically requires four hours to provide the first batch of material at acceptable dryness. In contrast a dryer in accordance with the invention only needs 40 minutes to provide the first batch of material at acceptable dryness for startup of the molding operation. A further advantage is afforded by the dryer in the preferred embodiment of the invention results from the use of three separate canisters in the heating, vacuum drying and material inventory positions 100, 102 104. This means that a new color may be introduced into the drying procedure while the preceding color or final batch of plastic resin material with the preceding colors is being dried and delivered. Hence there is no interruption in operation of the dryer in order to change colors of the granular resin material being dried. In contrast, a conventional desiccant dryer would require four hours of down time in order to change the color of the granular plastic resin being dried.

A dryer in accordance with the invention makes economical the recycling of nylon scrappage which heretofore has not been practical due to the drying time required for such scrappage. When nylon is conventionally processed and scrap nylon results as a byproduct of the process, in some cases it may take up to three days, using known methods and equipment, to dry the scrap nylon to a sufficient extent that the nylon can be reground and reprocessed. A dryer in accordance with the invention has been tested experimentally on such nylon recyclage and has been found to adequately process the nylon recyclage in six hours, amounting to a 92% reduction in drying time over that known heretofore. Hence, use of a dryer in accordance with the invention may provide a source of continuous supply of dried reprocessable nylon for recycling which has heretofore not been practical due to the affinity of nylon for moisture and the length of time it has taken to dry nylon recyclage to a sufficient degree to make it processable in a recycling mode.

Another important advantage of the invention is that plastic resin material being dried is exposed to heat for a much shorter time than with known methods, thereby reducing the risk of plastic degradation due to exposure to heat. Many molding materials, especially more expensive molding materials, are highly sensitive to exposure to heat. These materials, commonly referred to as "engineering" materials, include nylon, PET and various polycarbonates.

The foregoing describes the preferred embodiment and alternate embodiments of the invention and sets forth the best mode contemplated for carrying out the invention in such terms as to facilitate practice of the invention by a person of ordinary skill in the art. However, it is to be understood that the invention has many aspects, is not limited to the structure, processes, methods and embodiments disclosed and/or claimed and that equivalents to the disclosed structure, processes, methods, embodiments and claims are within the scope of the invention as defined by the claims appended hereto or added subsequently.

What is claimed is:

1. A low pressure dryer for granular or powdery material comprising:
   a. a frame;
   b. a plurality of canisters movably carried on said frame at least among material heating and vacuum drying positions;
   c. a material fill hopper supported by said frame;
   d. a valve supported by said frame for permitting downward flow of material from said fill hopper into a movable canister located below said fill hopper; and
   e. means for sensing presence of a canister below said fill hopper and disabling said valve from opening in the absence of a canister thereat.

2. A plastics resin material dryer comprising:
   a. a rotatable carousel including vertically oriented vane means for vertically supporting a manually removable canister and moving said canister among heating and vacuum drying positions;
   b. means for rotatably moving said carousel and supported canisters at least among said heating and vacuum drying positions;
   c. at least one canister for holding resin material being manually mountable on and removable from said carousel and being moved by carousel rotation at least among said heating and vacuum drying positions; and
   d. manually deactuable latching means for retaining a canister lowered into position on said carousel in locking engagement therewith.

3. The dryer of claim 2 wherein said carousel comprises:
   a. a first set of vertically elongated equi-angularly spaced blades; and
   b. a plurality of second sets of vertically elongated blades, connected to respective blades of said first set, with the blades of respective second sets and an associated connected blade of said first set being equi-angularly spaced.

4. A vacuum dryer for granular or powdery material including:
   a. at least one canister movable serially among at least material heating and vacuum drying positions;
   b. means for moving said canister among at least said heating and vacuum drying positions;
   c. a blower;
   d. a fitting for connecting a canister at the vacuum drying position to a source of vacuum; and
   e. a manifold for selectably directing air from said blower either to a canister at said heating position or to a delivery device portion of said dryer for pneumatic conveyance of dried granular material from said dryer to a receptacle for molding or extrusion.

5. The dryer of claim 4 wherein said delivery device receives dried granular material via downward flow from a canister.

6. The dryer of claim 5 wherein said canister furnishing said granular material to said delivery device is removed from said material heating and vacuum drying positions.

7. The dryer of claim 4 wherein said canisters are movable serially and sequentially among said heating and vacuum drying positions and a third material inventory management position.

8. The dryer of claim 7 wherein said canisters are emptied of material at said third position.

9. The dryer of claim 7 wherein said canisters are drained of material at said third position.

10. The dryer of claim 7 wherein said canisters are loaded with material at said third position.

11. The dryer of claim 9 wherein said canisters are loaded with material at said third position.

12. The dryer of claim 4 wherein said canisters are cylindrical.

13. The dryer of claim 12 wherein said canisters are oriented with their axes vertical.

14. The dryer of claim 13 wherein said canisters move about a common vertical axis.

15. In a vacuum dryer for granular or powdery material including:
   a. a plurality of canisters rotatable about a common vertical axis serially among material heating, vacuum drying and material inventory management positions;
   b. means for moving said canisters about said axis among said heating, vacuum drying and material inventory management positions;
   c. means for heating contents of a canister at the heating position;
   d. means for drawing vacuum in a canister at the vacuum drying position;
   the improvement by which said moving means further comprises:
   e. a carousel rotatable about said axis for carrying said canisters among said heating, vacuum drying and material inventory management positions, comprising a plurality of vanes extending radially outwardly from a vertically extending axial shaft, said vanes having upwardly facing vertices for receiving pins extending outwardly from said canisters thereby to vertically support said canisters as said carousel rotates.

16. The dryer of claim 15 wherein said upwardly facing vertices receive first pins extending outwardly from said canisters and said vanes further include:
   a. downwardly facing vertices for receiving second pins extending outwardly from said canisters below said first pins; and
   b. manually actuable latches for retaining said second pins in said downwardly facing vertices.

17. The dryer of claim 16 wherein said latches are rotatable between positions at which said second pins are retained in said downwardly facing vertices and at which said second pins may fall freely out of said downwardly facing vertices.

18. The dryer of claim 17 wherein said latches, in said position at which said second pins are retained in said downwardly facing vertices, bear against said pins with downwardly directed surfaces which are transverse to and radially spaced from a pivotal connection of said latch to an associated vane.

19. The dryer of claim 17 wherein said latches, in said position at which said second pins are retained in said downwardly facing vertices, bear against said pins with downwardly directed surfaces so that force received from said pins due to weight of said canister transfers to a vane along a line passing through pivotal connection of said latch and said latches are precluded from rotation about said pivotal connection.

20. The dryer of claim 15 wherein said canisters have curved exterior surfaces and said dryer further comprises resilient insulative covers fitting around said curved exterior surfaces with said covers including closure means for pulling respective edges of said covers towards one another thereby resiliently retaining said covers in place on said canisters.

* * * * *